US012555887B2

(12) United States Patent
Jia et al.

(10) Patent No.: US 12,555,887 B2
(45) Date of Patent: Feb. 17, 2026

(54) TRANSPARENT ANTENNA AND METHOD FOR FABRICATING THE SAME, ELECTRONIC DEVICE AND METHOD FOR DRIVING THE SAME

(71) Applicants: BEIJING BOE TECHNOLOGY DEVELOPMENT CO., LTD., Beijing (CN); BOE Technology Group Co., Ltd., Beijing (CN)

(72) Inventors: Mengwen Jia, Beijing (CN); Yafei Zhang, Beijing (CN); Dongdong Zhang, Beijing (CN); Jian Zhou, Beijing (CN); Xudong Zhang, Beijing (CN); Shuaipeng Tao, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 145 days.

(21) Appl. No.: 18/701,511

(22) PCT Filed: Mar. 17, 2023

(86) PCT No.: PCT/CN2023/082061
§ 371 (c)(1),
(2) Date: Apr. 15, 2024

(87) PCT Pub. No.: WO2024/192547
PCT Pub. Date: Sep. 26, 2024

(65) Prior Publication Data
US 2025/0233299 A1 Jul. 17, 2025

(51) Int. Cl.
*H01Q 1/38* (2006.01)
*H01Q 1/12* (2006.01)
(Continued)

(52) U.S. Cl.
CPC ............ *H01Q 1/1271* (2013.01); *H01Q 1/22* (2013.01); *G09G 3/3208* (2013.01); *G09G 3/36* (2013.01); *G09G 2354/00* (2013.01)

(58) Field of Classification Search
CPC .......... H01Q 1/1271; H01Q 1/22; H01Q 1/38; G09G 3/3208; G09G 3/36; G09G 2354/00
See application file for complete search history.

(56) References Cited

U.S. PATENT DOCUMENTS

2012/0049346 A1 3/2012 Lin et al.
2016/0276267 A1 9/2016 Lee et al.
(Continued)

FOREIGN PATENT DOCUMENTS

CN 103137442 A 6/2013
CN 105446075 A 3/2016
(Continued)

*Primary Examiner* — David E Lotter
(74) *Attorney, Agent, or Firm* — WHDA, LLP

(57) ABSTRACT

Disclosed are a transparent antenna and a method for fabricating the same, an electronic device and a method for driving the same. The method for fabricating the transparent antenna includes: providing a first substrate; forming a defining layer on the first substrate; processing the defining layer to have a first groove, where an opening width in a first direction of the first groove at a first distance between the first groove and the first substrate in a direction perpendicular to the first substrate is less than an opening width in the first direction of the first groove at a second distance between the first groove and the first substrate, the first distance is greater than the second distance, and the first direction is parallel to the first substrate; and forming an electrode layer in the first groove of the defining layer.

20 Claims, 10 Drawing Sheets

(51) Int. Cl.

| | |
|---|---|
| ***H01Q 1/22*** | (2006.01) |
| *G09G 3/3208* | (2016.01) |
| *G09G 3/36* | (2006.01) |

(56) References Cited

U.S. PATENT DOCUMENTS

| | | | | |
|---|---|---|---|---|
| 2017/0236751 | A1 | 8/2017 | Park et al. | |
| 2020/0295099 | A1* | 9/2020 | Liu ........................ | H10K 59/38 |
| 2023/0163059 | A1* | 5/2023 | Meng ................ | H01L 21/02164<br>257/773 |
| 2024/0047863 | A1 | 2/2024 | Zhou et al. | |

FOREIGN PATENT DOCUMENTS

| | | | |
|---|---|---|---|
| CN | 111342222 | A | 6/2020 |
| CN | 114051326 | A | 2/2022 |
| JP | H08-306680 | A | 11/1996 |
| JP | 2005-109014 | A | 4/2005 |
| KR | 20160112203 | A | 9/2016 |
| WO | 2022/193099 | A1 | 9/2022 |
| WO | 2022/222123 | A1 | 10/2022 |
| WO | 2023/020351 | A1 | 2/2023 |

* cited by examiner

TRANSPARENT ANTENNA AND METHOD FOR FABRICATING THE SAME, ELECTRONIC DEVICE AND METHOD FOR DRIVING THE SAME

FIELD

The present application relates to the technical field of displays, and more particularly, to a transparent antenna and a method for fabricating the same, an electronic device and a method for driving the same.

BACKGROUND

With the continuous development of mobile communication technology, as an indispensable component in mobile communication device, antennas are more widely used. In addition to the requirements for higher electrical performance of antennas, the requirements for transparency and aesthetics of antennas are also increasing. However, current antennas often have problems that transmittance is inversely proportional to radiation efficiency, and the aesthetics is low, etc.

Therefore, it is urgent to design a new antenna to solve the above problems.

SUMMARY

Embodiments of the present application adopt the following technical solutions.

On the one hand, the embodiments of the present disclosure provide a method for fabricating a transparent antenna, and the method includes:

providing a first substrate;

forming a defining layer on the first substrate;

processing the defining layer to have a first groove, where an opening width in a first direction of the first groove at a first distance between the first groove and the first substrate in a direction perpendicular to the first substrate is less than an opening width in the first direction of the first groove at a second distance between the first groove and the first substrate, the first distance is greater than the second distance, and the first direction is parallel to the first substrate;

forming an electrode layer in the first groove of the defining layer; where the electrode layer includes a radiation pattern and a feed line, both of which include a grid linear structure.

Alternatively, the forming the defining layer on the first substrate includes:

forming a dielectric layer on the first substrate;

forming a mask layer on the dielectric layer;

the processing the defining layer to have the first groove includes:

processing the mask layer to have a second groove; and processing the dielectric layer to have a third groove, wherein an opening width of at least part of the second groove in the first direction is less than an opening width of the third groove in the first direction; and the forming the electrode layer in the first groove of the defining layer includes:

forming the electrode layer in the second groove of the mask layer and in the third groove of the dielectric layer.

Alternatively, after the processing the dielectric layer to have the third groove and before the forming the electrode layer in the second groove of the mask layer and in the third groove of the dielectric layer, the method further includes:

forming a filling layer at least in the second groove of the mask layer and in the third groove of the dielectric layer, wherein the filling layer has a fourth groove; and the forming the electrode layer at least in the second groove of the mask layer and in the third groove of the dielectric layer includes:

forming the electrode layer in the fourth groove of the filling layer.

Alternatively, the processing the defining layer to have the first groove includes:

processing the mask layer to have the second groove;

processing the dielectric layer to have the third groove, wherein an opening width of the second groove in the first direction is less than the opening width of the third groove in the first direction; and the forming the filling layer at least in the second groove of the mask layer and in the third groove of the dielectric layer includes:

forming the filling layer on a surface of the mask layer on a side away from the first substrate, in the second groove of the mask layer and in the third groove of the dielectric layer.

Alternatively, a material of the dielectric layer includes a flexible material.

Alternatively, after the forming the electrode layer in the fourth groove of the filling layer, the method further includes:

removing the first substrate.

Alternatively, a material of the mask layer includes a non-metallic material.

Alternatively, after the forming the mask layer on the dielectric layer and before the processing the dielectric layer to have the third groove, the method further includes:

forming a first photoresist on the mask layer;

processing the first photoresist, so that the mask layer has the second groove;

processing the dielectric layer, so that the dielectric layer has the third groove; and removing the first photoresist.

Alternatively, a material of the mask layer includes a metal material.

Alternatively, after the forming the mask layer on the dielectric layer and before the processing the dielectric layer to have the third groove, the method further includes:

forming a first photoresist on the mask layer;

processing the first photoresist, so that the mask layer has the second groove;

removing the first photoresist;

forming a second photoresist on the mask layer;

processing the dielectric layer to have the third groove; and removing the second photoresist.

Alternatively, after the forming the mask layer on the dielectric layer and before the processing the dielectric layer to have the third groove, the method further includes:

forming a first photoresist on the mask layer;

processing the first photoresist, so that the mask layer has the second groove;

processing the dielectric layer, so that the dielectric layer has the third groove; and removing the first photoresist.

Alternatively, the filling layer includes a first sub-filling layer, a second sub-filling layer and a third sub-filling layer, the first sub-filling layer is connected to the third sub-filling layer through the second sub-filling layer, the second sub-filling layer is provided close to the first substrate, the first sub-filling layer and the third sub-filling layer are provided away from the first substrate, the first sub-filling layer and the third sub-filling layer cover the surface of the mask layer, the first sub-filling layer and the third sub-filling layer are symmetrical about a central axis of the second sub-filling layer and have a groove, and the central axis is perpendicular to the first substrate; and an opening width of the groove between the first sub-filling layer and the third sub-filling layer in the first direction is less than the opening width of the second groove of the mask layer in the first direction.

Alternatively, the first sub-filling layer includes a first filling portion and a second filling portion, the third sub-filling layer includes a third filling portion and a fourth filling portion, the first filling portion is connected to the second sub-filling layer through the second filling portion, the third filling portion is connected to the second sub-filling layer through the fourth filling portion, the first filling portion and the third filling portion are symmetrical about the center axis of the second sub-filling layer and have a groove, and the second filling portion and the fourth filling portion are symmetrical about the center axis of the second sub-filling layer and have a groove; and an opening width of the groove between the first filling portion and the third filling portion in the first direction is less than an opening width of the groove between the second filling portion and the fourth filling portion in the first direction.

Alternatively, a cross-sectional shape of the first filling portion close to the third filling portion along the direction perpendicular to the first substrate includes an arc; and a cross-sectional shape of the groove between the second filling portion and the fourth filling portion along the direction perpendicular to the first substrate includes an inverted trapezoid.

Alternatively, after the forming the filling layer on the surface of the mask layer on the side away from the first substrate, in the second groove of the mask layer and in the third groove of the dielectric layer, and before the forming the electrode layer in the fourth groove of the filling layer, the method further includes:

forming a leveling layer at least in the fourth groove of the filling layer;

processing the leveling layer to at least partially fill the groove between the second filling portion and the fourth filling portion; and the forming the electrode layer in the fourth groove of the filling layer includes:

forming the electrode layer at least in the groove between the first filling portion and the third filling portion.

Alternatively, the forming the leveling layer at least in the fourth groove of the filling layer includes:

forming the leveling layer on the surface of the filling layer on the side away from the first substrate and in the fourth groove of the filling layer;

the processing the leveling layer to at least partially fill the groove between the second filling portion and the fourth filling portion includes:

processing the leveling layer to be located between the first filling portion and the first substrate, and between the third filling portion and the first substrate, and have a fifth groove; and the forming the electrode layer at least in the groove between the first filling portion and the third filling portion includes:

forming the electrode layer in the groove between the first filling portion and the third filling portion and in the fifth groove.

Alternatively, after the processing the leveling layer to be located between the first filling portion and the first substrate, and between the third filling portion and the first substrate, and have the fifth groove, and before the forming the electrode layer in the groove between the first filling portion and the third filling portion and in the fifth groove, the method further includes:

forming a seed layer in part of the fifth groove, and on a side of the first filling portion and the third filling portion away from the first substrate, wherein the seed layer located in the fifth groove is in contact with the second sub-filling layer, and the seed layer on the side of the first filling portion and the third filling portion away from the first substrate has a sixth groove;

forming a third photoresist in the fifth groove, in the groove between the first filling portion and the third filling portion, in the sixth groove and on part of a surface of the seed layer on a side away from the first substrate;

processing the seed layer on the side of the first filling portion and the third filling portion away from the first substrate, so as to retain the seed layer between the third photoresist and the first filling portion and the third filling portion;

processing the third photoresist to be located in the fifth groove, and in the groove between the first filling portion and the third filling portion;

removing the seed layer on the side of the first filling portion and the third filling portion away from the first substrate;

removing the third photoresist; and the forming the electrode layer in the groove between the first filling portion and the third filling portion includes:

forming the electrode layer on the seed layer, wherein the electrode layer is located in the fifth groove, and in the groove between the first filling portion and the third filling portion.

Alternatively, after the processing the leveling layer to be located between the first filling portion and the first substrate, and between the third filling portion and the first substrate, and have the fifth groove, and before the forming the electrode layer in the groove between the first filling portion and the third filling portion and in the fifth groove, the method further includes:

forming a seed layer in part of the fifth groove, and on a side of the first filling portion and the third filling portion away from the first substrate, wherein the seed layer located in the fifth groove is in contact with the second sub-filling layer, and the seed layer on the side of the first filling portion and the third filling portion away from the first substrate has a sixth groove;

forming a third photoresist in the fifth groove, in the groove between the first filling portion and the third filling portion, in the sixth groove and on all of a surface of the seed layer on a side away from the first substrate;

processing the third photoresist to be located in the fifth groove, and in the groove between the first filling portion and the third filling portion;

removing the seed layer on the side of the first filling portion and the third filling portion away from the first substrate;

removing the third photoresist; and the forming the electrode layer in the groove between the first filling portion and the third filling portion includes:

forming the electrode layer on the seed layer, wherein the electrode layer is located in the fifth groove, and in the groove between the first filling portion and the third filling portion.

Alternatively, after the processing the leveling layer to be located between the first filling portion and the first substrate, and between the third filling portion and the first substrate, and have the fifth groove, and before the forming the electrode layer in the groove between the first filling portion and the third filling portion and in the fifth groove, the method further includes:

forming a seed layer in part of the fifth groove, and on a side of the first filling portion and the third filling portion away from the first substrate, wherein the seed layer located in the fifth groove is in contact with the second sub-filling layer, and the seed layer on the side of the first filling portion and the third filling portion away from the first substrate has a sixth groove;

forming a third photoresist in the fifth groove, and in the groove between the first filling portion and the third filling portion;

removing the seed layer on the side of the first filling portion and the third filling portion away from the first substrate;

removing the third photoresist; and the forming the electrode layer in the groove between the first filling portion and the third filling portion includes:

forming the electrode layer on the seed layer, wherein the electrode layer is located in the fifth groove, and in the groove between the first filling portion and the third filling portion.

Alternatively, the forming the leveling layer at least in the fourth groove of the filling layer includes:

forming the leveling layer on the side of the filling layer away from the first substrate, and in the fourth groove of the filling layer;

the processing the leveling layer to at least partially fill the groove between the second filling portion and the fourth filling portion includes:

processing the leveling layer to fully fill the groove between the second filling portion and the fourth filling portion; and the forming the electrode layer at least in the groove between the first filling portion and the third filling portion includes:

forming the electrode layer in the groove between the first filling portion and the third filling portion.

Alternatively, after the processing the leveling layer to fully fill the groove between the second filling portion and the fourth filling portion, and before the forming the electrode layer in the groove between the first filling portion and the third filling portion, the method further includes:

forming a seed layer on the leveling layer, and on a side of the first filling portion and the third filling portion away from the first substrate, wherein part of the seed layer on the leveling layer is located in the groove between the first filling portion and the third filling portion, and the seed layer on the side of the first filling portion and the third filling portion away from the first substrate has a sixth groove;

forming a third photoresist in the groove between the first filling portion and the third filling portion, in the sixth groove and on part of a surface of the seed layer on a side away from the first substrate;

processing the seed layer on the side of the first filling portion and the third filling portion away from the first substrate, so as to retain the seed layer between the third photoresist and the first filling portion and the third filling portion;

processing the third photoresist to be located in part of the groove between the first filling portion and the third filling portion;

removing the seed layer on the side of the first filling portion and the third filling portion away from the first substrate;

removing the third photoresist; and the forming the electrode layer in the groove between the first filling portion and the third filling portion includes:

forming the electrode layer on the seed layer, wherein the electrode layer is located in the groove between the first filling portion and the third filling portion.

In another aspect, the embodiments of the present disclosure provides a transparent antenna fabricated by the above method, the transparent antenna includes:

a first substrate;

a defining layer provided on the first substrate, wherein the defining layer has a first groove, an opening width in a first direction of the first groove at a first distance between the first groove and the first substrate along a direction perpendicular to the first substrate is less than an opening width in the first direction of the first groove at a second distance between the first groove and the first substrate, the first distance is greater than the second distance, and the first direction is parallel to the first substrate; and an electrode layer provided in the first groove of the defining layer, wherein the electrode layer includes a radiation pattern and a feeder line which include a grid linear structure.

Alternatively, the defining layer includes a mask layer and a dielectric layer, and the dielectric layer is located between the mask layer and the first substrate; and the mask layer has a second groove, the dielectric layer has a third groove, an opening width of at least part of the second groove in the first direction is less than an opening width of the third groove in the first direction, and the electrode layer is located in the second groove and the third groove.

Alternatively, the defining layer further includes a filling layer, the filling layer is located on a surface of the mask layer on a side away from the first substrate, in the second groove of the mask layer and in the third groove of the dielectric layer, the filling layer has a fourth groove, and the electrode layer is located in the fourth groove.

In a further aspect, the embodiments of the present disclosure provide an electronic device including the above transparent antenna.

Alternatively, the electronic device includes a display device including a display panel, the display panel includes a display substrate and the above transparent antenna, and the transparent antenna is provided on a light-emitting side of the display substrate.

Alternatively, the display panel further includes a touch control layer, a first polarization unit and a cover plate;

the touch control layer is provided between the display substrate and the transparent antenna; or, the touch control layer is provided on a side of the transparent antenna away from the display substrate;

the first polarization unit is provided on the side of the transparent antenna away from the display substrate; and the cover plate is provided on a side of the first polarization unit away from the display substrate.

Alternatively, the display device further includes a first controller and a second controller, and the first controller is electrically connected to and configured to control the display substrate; and the display panel includes a display region and a frame region connected to the display region, the transparent antenna is located in the display region and the frame region, the transparent antenna located in the display region is a grid linear structure, and the second controller is electrically connected to and configured to control the transparent antenna located in the frame region.

In a further aspect, the embodiments of the present disclosure provide a method for driving the above electronic device, and the method includes:

controlling, by the first controller, the display substrate to display; and controlling, by the second controller, the transparent antenna to radiate.

The above description is only an overview of the technical solution of the present application. In order to have a clearer understanding of the technical means of the present application, it can be implemented according to the content of the specification. In order to make the above and other purposes, features, and advantages of the present application more obvious and easier to understand, the specific implementations of the present application are listed below.

BRIEF DESCRIPTION OF THE DRAWINGS

In order to more clearly illustrate the technical solutions of the embodiments of the present application, the figures that are required to describe the embodiments of the present application will be briefly described below. Apparently, the figures that are described below are merely a part of the embodiments of the present application, and a person skilled in the art can obtain other figures according to these figures without paying creative work.

DETAILED DESCRIPTION

Figure 1:
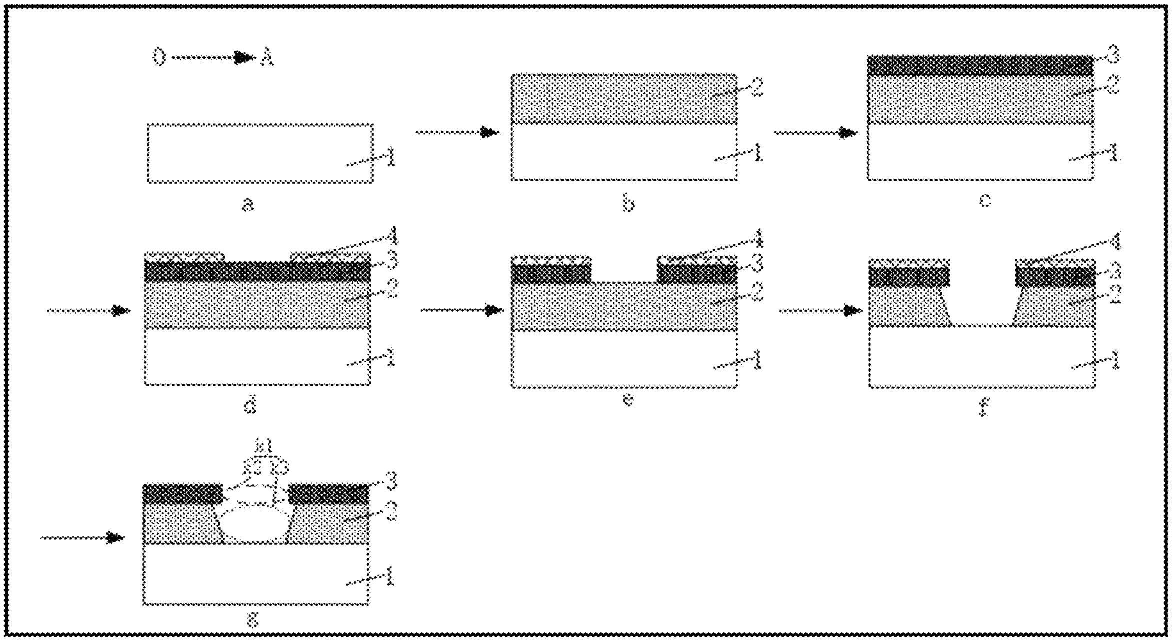
FIG. 1*a*-FIG. 1*g* are flowcharts of a method for fabricating a groove of a first transparent antenna provided in an embodiment of the present application.

The technical solutions according to the embodiments of the present application will be clearly and completely described below with reference to the drawings according to the embodiments of the present application. Apparently, the described embodiments are merely part of the embodiments of the present application, rather than all of the embodiments. All of the other embodiments that a person skilled in the art obtains on the basis of the embodiments of the present application without paying creative work fall within the protection scope of the present application.

In the drawings, in order for clarity, the thicknesses of the areas and the layers might be exaggerated. In the drawings, the same reference numbers represent the same or similar components, and therefore the detailed description on them are omitted. Moreover, the drawings are merely schematic illustrations of the present disclosure, and are not necessarily drawn to scale.

In the embodiments of the present application, unless stated otherwise, the meaning of “plurality of” is “two or more”. The terms that indicate orientation or position relations, such as “upper”, are based on the orientation or position relations shown in the drawings, and are merely for conveniently describing the present application and simplifying the description, rather than indicating or implying that the component or element must have the specific orientation and be constructed and operated according to the specific orientation. Therefore, they should not be construed as a limitation on the present application.

Unless stated otherwise in the context, throughout the description and the claims, the term “comprise” is interpreted as the meaning of opened containing, i.e., “including but not limited to". In the description of the present disclosure, the terms "one embodiment", "some embodiments", "exemplary embodiments", "example", "specific example" or "some examples" are intended to indicate that specific features, structures, materials or characteristics related to the embodiment or example are comprised in at least one embodiment or example of the present application. The illustrative indication of the above terms does not necessarily refer to the same one embodiment or example. Moreover, the specific features, structures, materials or characteristics may be comprised in any one or more embodiments or examples in any suitable manner.

In the embodiments of the present application, terms such as "first", "second', "third" and "fourth" are used to distinguish identical items or similar items that have substantially the same functions and effects, merely in order to clearly describe the technical solutions of the embodiments of the present application, and should not be construed as indicating or implying the degrees of importance or implicitly indicating the quantity of the specified technical features.

Embodiments of the present application provide a method for fabricating a transparent antenna, as shown in FIGS. 1-2, FIGS. 4-6 and FIGS. 11-14. The method includes S1-S20.

In S1, a first substrate 1 is provided.

The first substrate includes a variety of types, which can be selected and set according to actual needs. Exemplarily, the first substrate may be a rigid substrate, and a material of the rigid substrate may include glass, etc. Alternatively, the first substrate may be a flexible substrate, and a material of the flexible substrate may include PI (Polyimide), etc.

The structure of the first substrate is not specifically limited. Exemplarily, other film layers may be formed directly on the first substrate. Alternatively, the first substrate may include a substrate on which other film layers may be formed directly, depending on the actual application.

In S2, a defining layer is formed on the first substrate 1.

The structure of the defining layer is not specifically limited. Exemplarily, the defining layer may include two layers. For example, the defining layer shown in panel g of FIG. 1 includes a dielectric layer 2 and a mask layer 3. Alternatively, the defining layer may include three or more layers. For example, the defining layer shown in panel h of FIG. 2 includes a dielectric layer 2, a mask layer 3 and a filling layer 5. Of course, the defining layer may also include other film layers, depending on the actual application.

The fabricating process and material of the defining layer are not specifically limited, which may be determined based on the structure of the defining layer.

In S3, the defining layer is processed to have a first groove k1.

Figure 3:
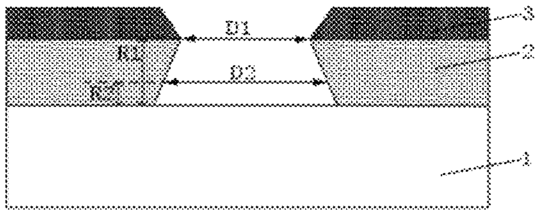
FIG. 3 is a schematic diagram of a groove structure of a transparent antenna provided in an embodiment of the present application.

As shown in FIG. 3, an opening width D1 in a first direction (the OA direction shown in the figure) of the first groove k1 at a first distance R1 between the first groove k1 and the first substrate 1 along a direction perpendicular to the first substrate 1 is less than an opening width D2 in the first direction of the first groove k1 at a second distance R2 between the first groove k1 and the first substrate 1. The first distance R1 is greater than the second distance R2, and the first direction (OA direction shown in the figure) is parallel to the first substrate 1.

The process for processing the defining layer is not specifically limited, which may be determined based on the structure of the defining layer. Exemplarily, as shown in panel d of FIG. 1, a first photoresist 4 may be coated on the dielectric layer 2 and the mask layer 3, and the dielectric layer 2 and the mask layer 3 may be etched to form the first groove k1 of the defining layer.

The number, shape, depth, etc. of the first groove of the defining layer are not specifically limited. Exemplarily, the first groove of the defining layer may be one as shown in FIG. 1. Alternatively, the first groove of the defining layer may be multiple. Exemplarily, the shape of the first groove of the defining layer may be as shown in panel g of FIG. 1. Specifically, as shown in FIG. 1, the defining layer includes the dielectric layer 2 and the mask layer 3, a cross-sectional shape of a third groove k3 of the dielectric layer 2 along the direction perpendicular to the first substrate 1 includes an inverted trapezoid, and a cross-sectional shape of the mask layer 3 along the direction perpendicular to the first substrate 1 includes a rectangle. Alternatively, the shape of the first groove of the defining layer may be as shown in FIG. 3. Specifically, as shown in FIG. 3, the defining layer includes the dielectric layer 2 and the mask layer 3, the cross-sectional shape of the third groove of the dielectric layer 2 along the direction perpendicular to the first substrate 1 includes a regular trapezoid, and the cross-sectional shape of the mask layer 3 along the direction perpendicular to the first substrate 1 includes an inverted trapezoid. The depth, etc. of the first groove of the defining layer may be determined based on the process for processing the defining layer.

Figure 2:
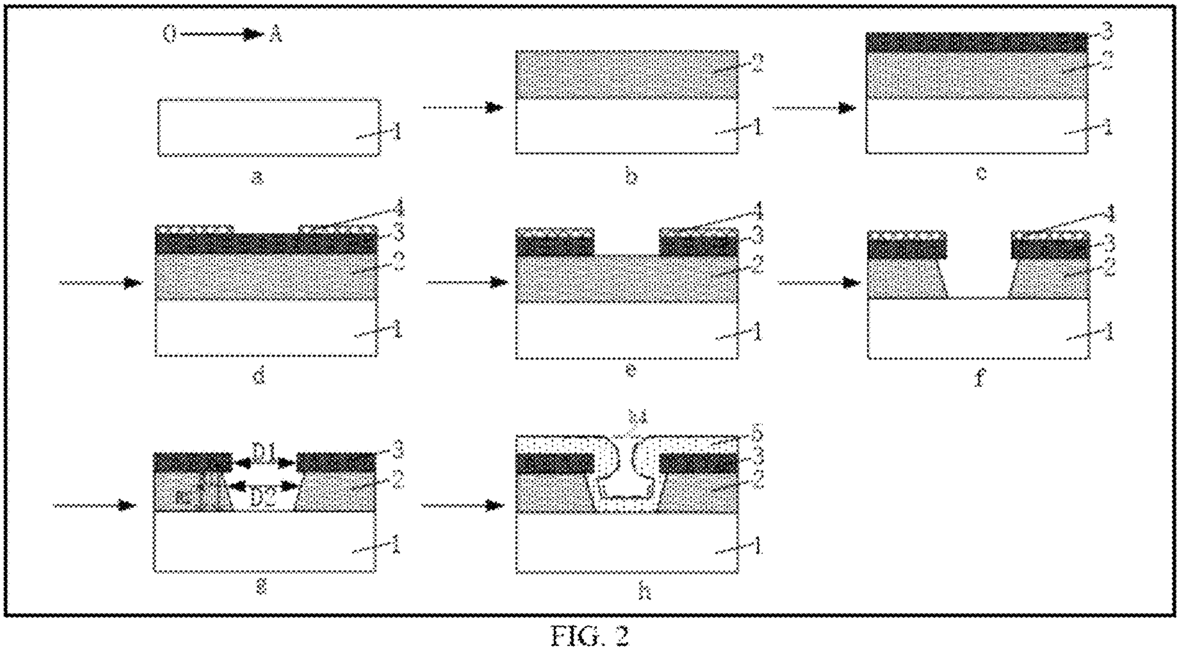
FIG. 2*a*-FIG. 2*h* are flowcharts of a method for fabricating a groove of a second transparent antenna provided in an embodiment of the present application.

The first distance R1 and the second distance R2 are not specifically limited, as long as the first distance R1 is greater than the second distance R2. Exemplarily, as shown in FIG. 2, when an opening width on the side away from the first substrate 1 in the cross-sectional shape of the third groove of the dielectric layer 2 along the direction perpendicular to the first substrate 1 is the largest along the OA direction, specifically, when the cross-sectional shape of the third groove shown in FIG. 2 along the direction perpendicular to the first substrate 1 is an inverted trapezoid, along the direction perpendicular to the first substrate 1, the first distance R1 may be any distance between the surface of the mask layer 3 in contact with the dielectric layer 2 and the surface of the mask layer 3 on a side away from the first substrate 1, and the second distance R2 may be any distance between the surface of the dielectric layer 2 in contact with the first substrate 1 and the surface of the dielectric layer 2 on a side away from the first substrate 1.

Exemplarily, as shown in FIG. 3, when an opening width on a side away from the first substrate 1 in the cross-sectional shape of the third groove of the dielectric layer 2 along the direction perpendicular to the first substrate 1 is the smallest along the first direction, specifically, when the cross-sectional shape of the third groove shown in FIG. 3 along the direction perpendicular to the first substrate 1 is a regular trapezoid, along the direction perpendicular to the first substrate 1, the first distance R1 may be any distance less than the second distance R2 between the surface of the mask layer 3 in contact with the dielectric layer 2 and the surface of the mask layer 3 on the side away from the first substrate 1. Further, optionally, the first distance R1 may be the spacing from the surface of the mask layer 3 in contact with the dielectric layer 2 to the first substrate 1, and the second distance R2 may be any distance from the surface of the dielectric layer 2 in contact with the first substrate 1 to the surface of the dielectric layer 2 on the side away from the first substrate 1, except for the spacing from the surface of the mask layer 3 in contact with the dielectric layer 2 to the first substrate 1.

It should be noted that, as shown in FIG. 3, when the first distance R1 is the spacing from the surface of the mask layer 3 in contact with the dielectric layer 2 to the first substrate 1, the mask layer 3 may not be provided on the dielectric layer 2, but an electrode layer may be formed directly in the third groove of the dielectric layer 2. Alternatively, the mask layer 3 may not be provided on the dielectric layer 2, but a filling layer may be provided on the dielectric layer 2, the electrode layer may be formed in the third groove of the dielectric layer 2 and the fourth groove of the filling layer.

As shown in FIG. 3, the cross-sectional shape of the second groove of the mask layer 3 along the direction perpendicular to the first substrate 1 is an inverted trapezoid, but of course not limited to this. The cross-sectional shape of the second groove of the mask layer along the direction perpendicular to the first substrate may also be a rectangle, a regular trapezoid, etc.

The groove shown in FIG. 3 may be directly etched by controlling the gas flow rate, but the groove in FIG. 3 does not provide better etching protection for the material in the groove compared to the fourth groove k4 in panel h of FIG. 2. More importantly, the line width of the groove in FIG. 3 is completely dependent on the exposure accuracy, etching accuracy, etc., and is limited by the process and device.

In S4, an electrode layer 10 is formed in the first groove k1 of the defining layer.

The electrode layer includes a radiation pattern and a feed line, both of which include a grid linear structure.

The material of the electrode layer is not specifically limited. Exemplarily, the material of the electrode layer may be metal material, such as copper, titanium, magnesium, etc. Alternatively, it may also be glass fiber with a metal coating. Alternatively, it may also be resin coated with conductive carbon material. The conductive carbon material includes graphene, a carbon fiber, and a carbon nanotube. When the material of the electrode layer is metal, the electrode layer is also metal wire.

The process for forming the electrode layer is not specifically limited. Exemplarily, the electrode layer may be formed by a process such as electroplating, deposition, etc. The advantage of the electroplating process is illustrated with the material of the electrode layer as metal. Since the deposition efficiency of sputter is low, in order to achieve thick metal with thin line width and high depth-to-width ratio, it is necessary to electroplate metal for rapid growth. Since the defining layer, etc., has already defined the electroplated area, i.e., the previously patterned area, the electroplating metal may only grow in the through hole, rather than on the surface of the defining layer, etc.

The number of feed lines is not specifically limited, which may be determined based on the type and specific situation of the transparent antenna. Exemplarily, in the case where the type of the transparent antenna is a dual-polarized antenna, the number of feed lines is two. Alternatively, in the case where the type of the transparent antenna is a non-dual-polarized antenna, the number of feed lines may be one. Of course, the number of feed lines may also be three or more, depending on the actual application.

Both the radiation pattern and the feed line both include a grid linear structure, which may be a metal grid structure. The line widths of the metal grid lines of the radiation pattern and the feeder line are not specifically limited. Exemplarily, the line widths of the grid lines of the radiation pattern and the feeder line may be 0.5-2 μm, specifically, 0.5 μm, 0.8 μm, 1 μm, 1.5 μm, 1.7 μm, or 2 μm, etc.

The thickness of the grid linear structure is not specifically limited, which may be controlled by a thickness of the defining layer. The thickness range of the grid linear structure is explained with the material of the electrode layer as metal. Considering unevenness of the electroplating metal, the thickness of the electroplating metal, for example, may be 80-90% of the thickness of the defining layer. This is because thin metal will affect the radiation efficiency, while thick metal will seriously affect the transmittance. Exemplarily, a ratio of the thickness of the grid linear structure along the direction perpendicular to the first substrate to the line width of the grid linear structure may be greater than or equal to 2. For example, a depth-to-width ratio of the grid linear structure may be 2, 3, 4, 5, 6, or 7, etc.

The spacing between adjacent grid lines in the grid linear structure is not specifically limited. Exemplarily, the spacing between adjacent grid lines in the grid linear structure may be 20-250 μm, preferably 50-200 μm, specifically 50 μm, 100 μm, or 200 μm, etc.

The transmittance of the grid linear structure is not specifically limited. Exemplarily, the transmittance of the grid linear structure may be greater than 80%, for example, the transmittance range is 86-92%, specifically 86%, 87%, 88%, 89%, 90%, 91%, or 92%, etc.

The line width of grid lines of the radiation pattern may be set to be less than a spacing between adjacent grid lines of the radiation pattern, and the thickness of the radiation pattern along the direction perpendicular to the first substrate may be set to be greater than the line width of grid lines of the radiation pattern. The line width of grid lines of the feed line may be set to be less than the spacing between adjacent grid lines of the radiation pattern, and the thickness of the feed line along the direction perpendicular to the first substrate may be set to be greater than the line width of grid lines of the radiation pattern.

On the one hand, the electrode layer with better light transmittance may be obtained by setting the radiation pattern and the feed line as grid linear structures and combining with the light-transmissive first substrate; on the other hand, the electrode layer with a high depth-to-width ratio may be obtained by adjusting the line widths and thicknesses of the grid linear structures, so as to ensure the radiation of the antenna and further improve the light transmittance of the electrode layer without affecting the electrical performance of each radiation pattern, thereby improving the light transmission performance of the transparent antenna and making it more suitable for use in the display region of the electronic device.

It should be noted that the line width of grid lines of the radiation pattern and the feed line, the spacing between adjacent grid lines, and their respective thicknesses along the direction perpendicular to the first substrate may be the same or different.

The method for fabricating the transparent antenna provided in the embodiments of the present application includes: providing a first substrate; forming a defining layer on the first substrate; processing the defining layer to have a first groove; where an opening width in a first direction of the first groove at a first distance between the first groove and the first substrate along a direction perpendicular to the first substrate is less than an opening width in the first direction of the first groove at a second distance between the first groove and the first substrate, the first distance is greater than the second distance, and the first direction is parallel to the first substrate; forming an electrode layer in the first groove of the defining layer; where the electrode layer includes a radiation pattern and a feed line which include a grid linear structure.

Thus, on the one hand, since the electrode layer is provided in the first groove of the defining layer, the electrode layer with a high depth-to-width ratio, that is, a metal wire with a high depth-to-width ratio, may be obtained by controlling the thickness of the electrode layer in the direction perpendicular to the first substrate by the thickness of the first groove of the defining layer along the direction perpendicular to the first substrate, and controlling the width of the electrode layer along the direction parallel to the first substrate by the width of the first groove of the defining layer along the direction parallel to the first substrate. Since the first groove of the defining layer is along the direction perpendicular to the first substrate, the opening width in the first direction of the first groove at the first distance between the first groove and the first substrate is less than the opening width in the first direction of the first groove at the second distance between the first groove and the first substrate, and the first distance is greater than the second distance, so that the electrode layer may be further narrowed along a direction away from the first substrate, and the electrode layer which is thinner along the first direction may be obtained, i.e., the radiation pattern and the feed line in the transparent antenna have a higher depth-to-width ratio, the transparent antenna may radiate efficiently, and when the transparent antenna with extremely thin line width of metal wire is applied to the electronic device, such as integrated in the display device, the influence on the display function of the display device may be greatly reduced or even eliminated. On the other hand, the light transmittance of the electrode layer may be effectively improved by setting the radiation pattern and the feed line as grid linear structures, so that the transparent antenna as a whole has a transparent effect with excellent light transmittance, and the range of light transmittance may reach 86-92%, which is more conductive to application in the display device.

Optionally, as shown in FIGS. 1-2, FIGS. 4-6, and FIGS. 11-14, S2: forming a defining layer on the first substrate 1 includes S21-S22.

In S21, a dielectric layer 2 is formed on the first substrate 1.

The material of the dielectric layer is not specifically limited. Exemplarily, the material of the dielectric layer may include organic adhesive material, flexible material, etc.

The process for fabricating the dielectric layer is not specifically limited. Exemplarily, the organic adhesive material may be coated on the first substrate by a coating process and cured to form the dielectric layer, so that the thickness of the dielectric layer along the direction perpendicular to the first substrate is large and it is easy to fabricate.

In S22, a mask layer 3 is formed on the dielectric layer 2.

The material of the mask layer is not specifically limited. Exemplarily, the material of the mask layer may include metal, such as ITO (Indium Tin Oxides), molybdenum (Mo), molybdenum/aluminum/molybdenum (Mo/Al/Mo), titanium/aluminum/titanium (Ti/Al/Ti), etc. Alternatively, the material of the mask layer may include non-metal, such as silicon nitride (SiN), silicon oxide (SiO), silicon oxynitride (SiON), etc.

The process for fabricating the mask layer is not specifically limited. Exemplarily, PECVD (Plasma Enhanced Chemical Vapor Deposition), TFE (Thin Film Encapsulation), CVD (Chemical Vapor Deposition), etc., may be used to fabricate the mask layer.

The thickness of the mask layer is not specifically limited. Exemplarily, the thickness range of the mask layer along the direction perpendicular to the first substrate may include 90-110 nm. Specifically, the thickness of the mask layer along the direction perpendicular to the first substrate may be 90 nm, 100 nm, or 110 nm, etc.

S3: processing the defining layer to have the first groove k1 includes S31-S32.

In S31, the mask layer 3 is processed to have a second groove k2.

The process for fabricating the second groove is not specifically limited. Exemplarily, a photoresist may be coated on the mask layer by a coating process, and the photoresist may be etched by an etching process to form the second groove.

In S32, the dielectric layer 2 is processed to have a third groove k3.

The process for fabricating the third groove is not specifically limited. Exemplarily, the dielectric layer may be etched by an ICP (Inductively Coupled Plasma Etching) process, and the third groove may be obtained by controlling gas flow rate, etching time, etc. The width of the third groove along the OA direction is greater than that of the second groove along the OA direction. The gas flow rate, etching time, etc., may be determined based on the device.

An opening width D1 of at least part of the second groove k2 in the first direction (the OA direction shown in the figure) is less than an opening width D2 of the third groove k3 in the first direction (the OA direction shown in the figure).

The opening width of at least part of the second groove in the OA direction is less than the opening width of the third groove in the OA direction, which means that the opening width of part of the second groove in the OA direction is less than the opening width of the third groove in the OA direction; or the opening width of all of the second groove in the OA direction is less than the opening width of the third groove in the OA direction. As shown in FIG. 2, the opening width D1 of all of the second groove in the OA direction is less than the opening width D2 of the third groove in the OA direction.

In S4, forming the electrode layer 10 in the first groove k1 of the defining layer includes:

S41: forming the electrode layer 10 in the second groove k2 of the mask layer 3 and in the third groove k3 of the dielectric layer 2.

The process for forming the electrode layer in the second groove of the mask layer and in the third groove of the dielectric layer is not specifically limited. Exemplarily, an electroplating process may be used to form the electrode layer in the second groove of the mask layer and in the third groove of the dielectric layer.

In the method for fabricating the transparent antenna provided in the embodiments of the present application, the electrode layer with a high depth-to-width ratio, i.e., a metal wire with a high depth-to-width ratio may be obtained by providing the electrode layer in the second groove of the mask layer and the third groove of the dielectric layer, controlling the thickness of the electrode layer along the direction perpendicular to the first substrate by the thicknesses of the second groove of the mask layer and the third groove of the dielectric layer in the direction perpendicular to the first substrate, and controlling the width of the electrode layer along the direction parallel to the first substrate by controlling the thicknesses of the second groove of the mask layer and the third groove of the dielectric layer along the direction parallel to the first substrate direction. Since the opening width of at least part of the second groove in the first direction is less than the opening width of the third groove in the first direction, the electrode layer may be further narrowed along the direction away from the first substrate by the second groove of the mask layer, the electrode layer electrode layer which is thinner in the first direction may be obtained, i.e., the radiation pattern and the feed line in the transparent antenna have a higher depth-to-width ratio, the transparent antenna may radiate efficiently; and when the transparent antenna with extremely thin line width of metal wire is applied to the electronic device, such as integrated in the display device, the influence on the display function of the display device may be greatly reduced or even eliminated; on the other hand, the light transmittance of the electrode layer may be effectively improved by setting the radiation pattern and the feed line as grid linear structures, so that the transparent antenna as a whole has a transparent effect with excellent light transmittance, and the range of light transmittance may reach 86-92%, which is more conducive to application in the display device.

Optionally, as shown in FIG. 2, FIGS. 4-6, and FIGS. 11-14, after S32: processing the dielectric layer 2 to have a third groove, and before S41: forming the electrode layer 10 in the second groove of the mask layer 3 and in the third groove of the dielectric layer 2, the fabricating method further includes:

S5: forming a filling layer 5 at least in the second groove of the mask layer 3 and in the third groove of the dielectric layer 2.

The filling layer 5 has a fourth groove k4.

Forming the filling layer at least in the second groove of the mask layer and the third groove of the dielectric layer refers to forming the filling layer only in the second groove of the mask layer and in the third groove of the dielectric layer; or, in addition to forming the filling layer in the second groove of the mask layer and the third groove of the dielectric layer, forming the filling layer on other structures, for example, forming the filling layer 5 on the surface of the mask layer 3 on the side away from the first substrate 1, in the second groove and in the third groove, as shown in FIG. 2.

The material of the filling layer is not specifically limited. Exemplarily, the material of the filling layer may include silicon oxynitride (SiON), etc. It should be noted that the material of the filling layer may be the same as the material of the mask layer, so that interfacial effects may be avoided. Of course, the material of the filling layer may also be different from the material of the mask layer, which is not specifically limited.

The process for fabricating the filling layer is not specifically limited. Exemplarily, the filling layer may be formed by the deposition process.

S41: forming the electrode layer in the second groove of the mask layer and in the third groove of the dielectric layer includes:

S411: forming an electrode layer 10 in the fourth groove k4 of the filling layer 5.

In the method for fabricating the transparent antenna provided in the embodiments of the present application, the electrode layer with a higher depth-to-width ratio, i.e., a metal wire with a high depth-to-width ratio may be obtained by providing the electrode layer in the fourth groove of the filling layer, controlling the thickness of the electrode layer along the direction perpendicular to the first substrate by the thickness of the fourth groove of the filling layer along the direction perpendicular to the first substrate, and controlling the width of the electrode layer along the direction parallel to the first substrate by the width of the fourth groove of the filling layer along the direction parallel to the first substrate. Since the opening width of the fourth groove of the filling layer in the first direction is less than the opening width of the second groove in the first direction and the opening width of the third groove in the first direction, respectively, the electrode layer may further narrowed along the direction away from the first substrate by the fourth groove of the filling layer, and the electrode layer which is very thin in the first direction may be obtained, i.e., the radiation pattern and the feed line in the transparent antenna have a higher depth-to-width ratio, the transparent antenna may radiate efficiently, and when the transparent antenna with extremely thin line width of metal wire is applied to the electronic device, such as integrated in the display device, the influence on the display function of the display device may be greatly reduced or even eliminated. On the other hand, the light transmittance of the electrode layer may be effectively improved by setting the radiation pattern and the feed line as grid linear structures, so that the transparent antenna as a whole has a transparent effect with excellent light transmittance, and the range of light transmittance may reach 86-92%, which is more conducive to application in the display device.

Optionally, as shown in FIG. 2, FIGS. 4-6, and FIGS. 11-14, S3: processing the defining layer to have a first groove includes:

S33: processing the mask layer 3 to have a second groove; and

S34: processing the dielectric layer 2 to have a third groove.

The opening width D1 of the second groove in the first direction (the OA direction shown in the figure) is less than the opening width D2 of the third groove in the first direction (the OA direction shown in the figure).

S5: forming a filling layer 5 at least in the second groove of the mask layer 3 and in the third groove of the dielectric layer 2 includes:

S51: forming the filling layer 5 on the surface of the mask layer 3 on the side away from the first substrate 1, in the second groove of the mask layer 3 and in the third groove of the dielectric layer 2.

In the method for fabricating the transparent antenna provided in the embodiments of the present application, the electrode layer with a high depth-to-width ratio, i.e., a metal wire with a high depth-to-width ratio may be obtained by providing the electrode layer in the second groove of the mask layer and the third groove of the dielectric layer, controlling the thickness of the electrode layer along the direction perpendicular to the first substrate by the thicknesses of the second groove of the mask layer and the third groove of the dielectric layer along the direction perpendicular to the first substrate, and controlling the width of the electrode layer along the direction parallel to the first substrate by the widths of the second groove of the mask layer and the third groove of the dielectric layer along the direction parallel to the first substrate. Since the opening width of the second groove in the first direction is less than the opening width of the third groove in the first direction, the electrode layer may further narrowed along the direction away from the first substrate by the second groove of the mask layer, and the electrode layer which is thinner in the first direction may be obtained, i.e., the radiation pattern and the feed line in the transparent antenna have a higher depth-to-width ratio, the transparent antenna may radiate efficiently, and when the transparent antenna with extremely thin line widths of metal wires is applied to the electronic device, such as integrated in the display device, the influence on the display function of the display device may be greatly reduced or even eliminated. On the other hand, the light transmittance of the electrode layer may be effectively improved by setting the radiation pattern and the feed line as grid linear structures, so that the transparent antenna as a whole has a transparent effect with excellent light transmittance, and the range of light transmittance may reach 86-92%, which is more conductive to application in the display device.

Optionally, the material of the dielectric layer includes flexible material, so that a flexible transparent antenna may be obtained.

The flexible material is not specifically limited. Exemplarily, the flexible material may include COP (Copolymers of Cycloolefin), PI, PET (Polyethylene Terephthalate), etc.

Figure 4:
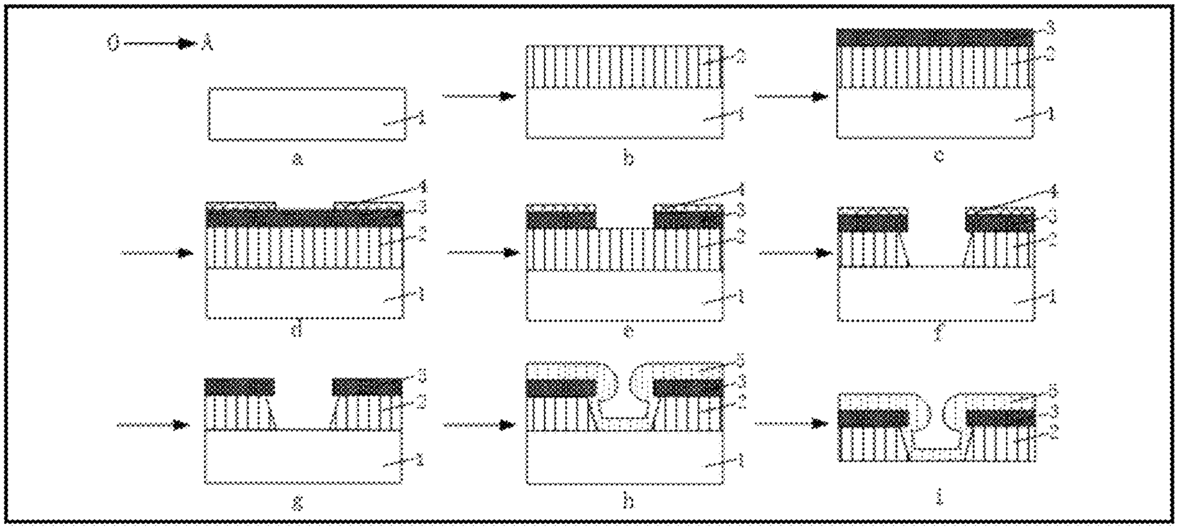
FIG. 4*a*-FIG. 4*i* are flowcharts of a method for fabricating a groove of a third transparent antenna provided in an embodiment of the present application.

Optionally, as shown in FIG. 4, after S411: forming the electrode layer in the fourth groove of the filling layer 5, the method further includes:

S6: removing the first substrate 1.

The above process for removing the first substrate the filling layer 5 is not specifically limited. Exemplarily, the first substrate may be removed by mechanical or laser sintering, etc.

In the method for fabricating the transparent antenna provided in the embodiments of the present application, the flexible material may be directly attached to the first substrate to form a dielectric layer, and a third groove may be directly etched on the flexible dielectric layer without the organic adhesive layer, and finally the flexible dielectric layer may be conveniently removed from the first substrate by Lami process, which is easy to separate.

Optionally, the material of the mask layer includes a non-metallic material.

The non-metallic material is not specifically limited. Exemplarily, the non-metallic material may be silicon nitride (SiN), silicon oxide (SiO), silicon oxynitride (SiON), etc.

Optionally, as shown in FIG. 1 and FIGS. 11-14, after S22: forming the mask layer 3 on the dielectric layer 2, and before S32: processing the dielectric layer 2 to have the third groove k3, the method further includes S7-S10.

In S7, a first photoresist 4 is formed on the mask layer 3.

In S8, the first photoresist 4 is processed, so that the mask layer 3 has a second groove k2.

The process for fabricating the second groove is not specifically limited. Exemplarily, the first photoresist may be patterned, the mask layer may be processed by dry etching, so that the mask layer has the second groove.

In S9, the dielectric layer 2 is processed to have a third groove k3.

The process for fabricating the third groove is not specifically limited. Exemplarily, the dielectric layer may be etched by an ICP (Inductively Coupled Plasma Etching) process, and the gas flow rate, etching time, etc., may be controlled, so as to obtain the third groove. The width of the third groove along the OA direction is greater than the width of the second groove along the OA direction. The gas flow rate, etching time, etc., may be determined according to the device.

In S10, the first photoresist 4 is removed.

In the method for fabricating the transparent antenna provided in the embodiments of the present application, the mask layer may be processed by dry etching, and the dielectric layer may be processed by ICP, which is simple and easy to realize.

Optionally, the material of the mask layer includes a metal material. The dielectric layer may be patterned by using a metal hard mask as a mask plate, and then the electrode layer is electroplated, which is simple and easy to realize.

The metal material is not specifically limited. Exemplarily, the metal material may include ITO (Indium Tin Oxides), molybdenum (Mo), aluminum (Al), etc.

The above process for fabricating the mask layer is not specifically limited. Exemplarily, the metal mask layer may be patterned by dry etching. Alternatively, the metal mask layer may be patterned by wet etching.

Optionally, as shown in FIG. 5 and FIGS. 11-14, after S22: forming the mask layer 3 on the dielectric layer 2, and before S32: processing the dielectric layer 2 to have the third groove, the fabricating method further includes S11-S16.

In S11, the first photoresist 4 is formed on the mask layer 3.

In S12, the first photoresist 4 is processed, so that the mask layer 3 has the second groove.

The above process for processing the first photoresist is not specifically limited. Exemplarily, the first photoresist and the mask layer may be processed by dry etching and wet etching, so that the mask layer has the second groove. Specifically, the first photoresist may be dry etched first, and then the mask layer may be wet etched, so that the mask layer has the second groove.

In S13, the first photoresist 4 is removed.

In S14, a second photoresist 6 is formed on the mask layer.

In S15, the dielectric layer 2 is processed to have a third groove.

The above process for processing the dielectric layer is not specifically limited. Exemplarily, the second photoresist and the dielectric layer may be processed by RIE (Reactive Ion Etching), so that the dielectric layer has the third groove.

In S16, the second photoresist 6 is removed.

In the method for fabricating the transparent antenna provided in the embodiments of the present application, the material of the mask layer is metal material, and the mask layer may be correspondingly etched by wet etching. On the one hand, since the thermal tolerance temperature of organic adhesive material is not high, the deposition device for inorganic oxides such as SiON is limited. The low temperature TFECVD deposition is generally used, while the deposition temperature of depositing metal by sputter is generally low, which is much lower than that of organic adhesive material, so that the selection range of the material is enlarged. On the other hand, the second groove of the dielectric layer obtained by the fabricating method of the embodiments of the present application has a smaller angle (slope angle) between the second groove of the dielectric layer and the first substrate, compared to the second groove of the dielectric layer obtained only by dry etching, ICP, etc., so that the protection area of the fourth groove of the filling layer for vertical etching may be expanded after forming the fourth groove of the filling layer.

Optionally, as shown in FIG. 6 and FIGS. 11-14, after S22: forming the mask layer 3 on the dielectric layer 2, and before S32: processing the dielectric layer 2 to have the third groove, the fabricating method further includes S17-S20.

In S17, the first photoresist 4 is formed on the mask layer 3.

In S18, the first photoresist 4 is processed, so that the mask layer 3 has the second groove.

In S19, the dielectric layer 2 is processed to have the third groove.

In S20, the first photoresist 4 is removed.

Figure 5:
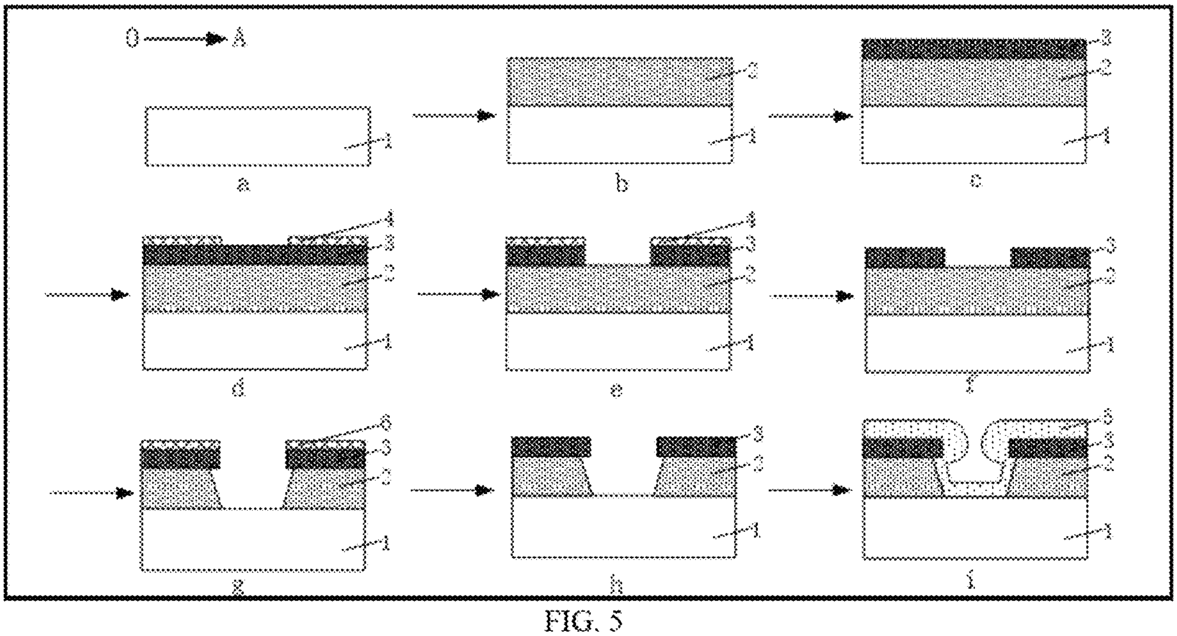
FIG. 5*a*-FIG. 5*i* are flowcharts of a method for fabricating a groove of a fourth transparent antenna provided in an embodiment of the present application.
Figure 7:
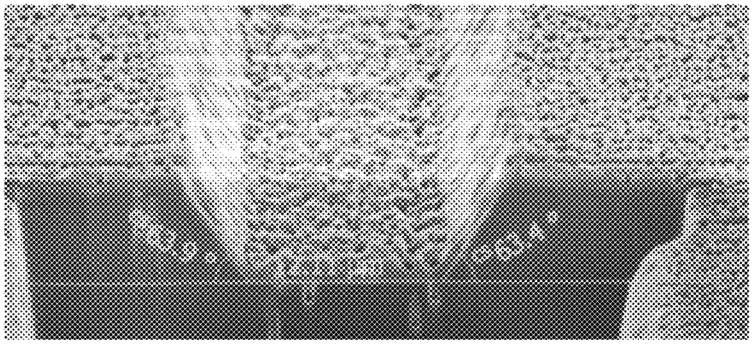
FIG. 7 is an SEM diagram of a structure shown in FIG. 6*h;*

In the method for fabricating the transparent antenna provided in the embodiments of the present application, the step of removing the first photoresist 4 in panel g of FIG. 5 is canceled based on FIG. 5, so that the groove with a smaller slope angle may be obtained. The actual processing effect is as shown in FIG. 7. Thus, the protection area for the material in the groove is also larger. As shown in FIG. 7, the left slope angle of the second groove of the dielectric layer is 63.9° on the left side and 63.4° on the right side, and the width along the first direction of the second groove of the dielectric layer in contact with the first substrate is 12.11 μm.

Figure 8:
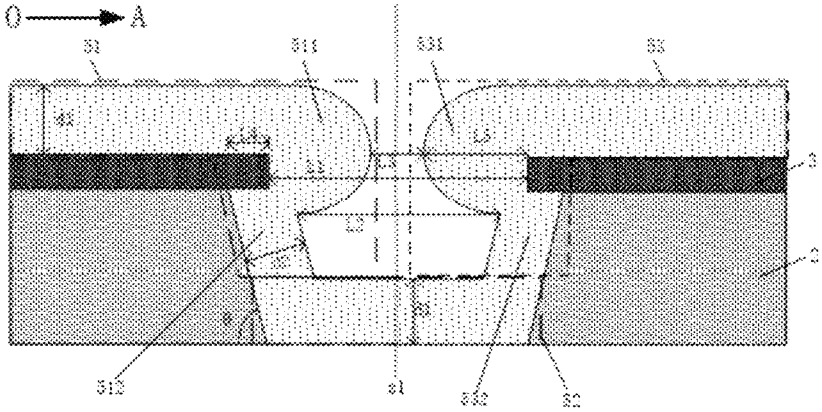
FIG. 8 is a schematic diagram of a groove structure of another transparent antenna provided in an embodiment of the present application.

Optionally, as shown in FIG. 8, the filling layer includes a first sub-filling layer 51, a second sub-filling layer 52 and a third sub-filling layer 53. The first sub-filling layer 51 is connected to the third sub-filling layer 53 through the second sub-filling layer 52. The second sub-filling layer 52 is provided close to the first substrate, and the first sub-filling layer 51 and the third sub-filling layer 53 are provided away from the first substrate. The first sub-filling layer 51 and the third sub-filling layer 53 cover the surface of the mask layer 3. The first sub-filling layer 51 and the third sub-filling layer 53 are symmetrical about a central axis z1 of the second sub-filling layer 52 and have a groove, and the central axis z1 is perpendicular to the first substrate. The opening width of the groove between the first sub-filling layer 51 and the third sub-filling layer 53 in the first direction (the OA direction in the figure) is less than the opening width of the second groove of the mask layer in the first direction (the OA direction in the figure).

The structure of the above first sub-filling layer is not specifically limited. Exemplarily, the first sub-filling layer may be an overall structure; alternatively, the first sub-filling layer may include a plurality of filling portions.

The structure of the above second sub-filling layer is not specifically limited. Exemplarily, the second sub-filling layer may be an overall structure; alternatively, the second sub-filling layer may include a plurality of filling portions.

The structure of the above third sub-filling layer is not specifically limited. Exemplarily, the third sub-filling layer may be an overall structure; or, the third sub-filling layer may include a plurality of filling portions. FIG. 8 illustrates the first sub-filling layer 51 including a first filling portion 511 and a second filling portion 512, the second sub-filling layer 52 as an overall structure, and the third sub-filling layer 51 including a third filling portion 531 and a fourth filling portion 532 as an example.

The shape of the groove between the first sub-filling layer and the third sub-filling layer along the direction perpendicular to the first substrate is not specifically limited. Exemplarily, the shape of the groove between the first sub-filling layer and the third sub-filling layer along the direction perpendicular to the first substrate may be a rectangle, an irregular shape, etc. FIG. 8 illustrates the butterfly shaped groove between the first sub-filling layer 51 and the third sub-filling layer 53 as an example.

In the method for fabricating the transparent antenna provided in the embodiments of the present application, the opening width of the groove between the first sub-filling layer and the third sub-filling layer in the OA direction is set to be less than the opening width of the second groove of the mask layer in the OA direction, so that the electrode layer may be further narrowed along the direction away from the first substrate by the filling layer, the electrode layer which is thinner along the first direction may be obtained, i.e., the radiation pattern and the feed line in the transparent antenna have a higher depth-to-width ratio, the transparent antenna may radiate efficiently; and when the transparent antenna with extremely thin line widths of metal wires is applied to the electronic device, such as integrated in the display device, the influence on the display function of the display device may be greatly reduced or even eliminated.

Optionally, as shown in FIG. 8, the first sub-filling layer 51 includes a first filling portion 511 and a second filling portion 512, and the third sub-filling layer 53 includes a third filling portion 531 and a fourth filling portion 532. The first filling portion 511 is connected to the second sub-filling layer 52 through the second filling portion 512, and the third filling portion 531 is connected to the second sub-filling layer 52 through the fourth filling portion 532. The first filling portion 511 and the third filling portion 531 are symmetrical about the central axis z1 of the second sub-filling layer 52 and have a groove, and the second filling portion 512 and the fourth filling portion 532 are symmetrical about the central axis z1 of the second sub-filling layer 52 and have a groove. The opening width of the groove between the first filling portion 511 and the third filling portion 531 in the first direction (the OA direction in the figure) is less than the opening width of the groove between the second filling portion 512 and the fourth filling portion 532 in the first direction (the OA direction in the figure).

The structures of the first filling portion and the second filling portion are not specifically limited. Exemplarily, the structures of the first filling portion and the second filling portion may be the same; alternatively, the structures of the first filling portion and the second filling portion may be different.

The structures of the third filling portion and the fourth filling portion are not specifically limited. Exemplarily, the structures of the third filling portion and the fourth filling portion may be the same; alternatively, the structures of the third filling portion and the fourth filling portion may be different.

In the method for fabricating the transparent antenna provided in the embodiments of the present application, the opening width of the groove between the first filling portion and the third filling portion in the OA direction is set to be less than the opening width of the groove between the second filling portion and the fourth filling portion in the OA direction, so that the electrode layer may be further narrowed in the direction far away from the first substrate through the first filling portion and the third filling portion, and the electrode layer which is thinner along the first direction may be obtained, i.e., the radiation pattern and the feed line in the transparent antenna have a higher depth-to-width ratio, the transparent antenna may radiate efficiently; and when the transparent antenna with extremely thin line width of metal wire is applied to the electronic device, such as integrated in the display device, the influence on the display function of the display device may be greatly reduced or even eliminated.

Optionally, as shown in FIG. 8, the cross-sectional shape of the first filling portion 511 close to the third filling portion 531 along the direction perpendicular to the first substrate includes an arc; and the cross-sectional shape of the groove between the second filling portion 512 and the fourth filling portion 532 along the direction perpendicular to the first substrate includes an inverted trapezoid.

As shown in FIG. 8, a width of the second groove of the mask layer 3 along the OA direction is $L_1$, a thickness of the first filling portion 511 on a side away from the mask layer 3 along the direction perpendicular to the first substrate is $d_1$, a thickness of the second filling layer 52 along the direction perpendicular to the first substrate is $d_1$, an angle between the second filling layer 52 and the first substrate is θ (a slope angle of the second filling layer 52 is θ), a minimum width of the groove between the first filling portion 511 and the third filling portion 531 along the OA direction is $L_3$, a maximum width of the groove between the first filling portion 511 and the third filling portion 531 along the OA direction is $L_2$, a width of a protruding portion of the mask layer 3 with respect to the dielectric layer 2 along the OA direction is $L_4$, a maximum width of a protruding portion of the third filling portion 531 with respect to the mask layer 3 along the OA direction is $L_5$, and a width of the second filling portion 512 along the OA direction is $d_2$, where $d_2=a\times d_1$, the value range of a is 0.3-0.4, and generally, a=0.35. Since $$L_2 = L_1 + 2\times\left(L_4 - \frac{d_2}{\sin\theta}\right);$$

$$L_5 = d_1 \times 0.7;$$

and $$L_3 = L_1 - 2\times L_5,$$

$d_1$ satisfies the requirement of $d_1<L_1/1.4$; otherwise, the opening of the groove will be sealed. Even if the line width may reach up to 5 μm after photolithography and etching, $L_3$ may be narrowed to less than 2 μm by only depositing SiON in a thickness of about 2 μm.

Figure 9:
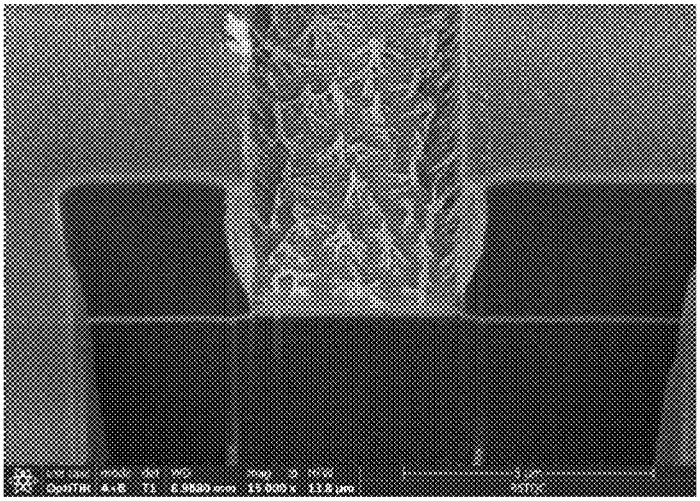
FIG. 9 is an SEM diagram of the structure shown in FIG. 8 etched to a bottom of a dielectric layer.
Figure 10:
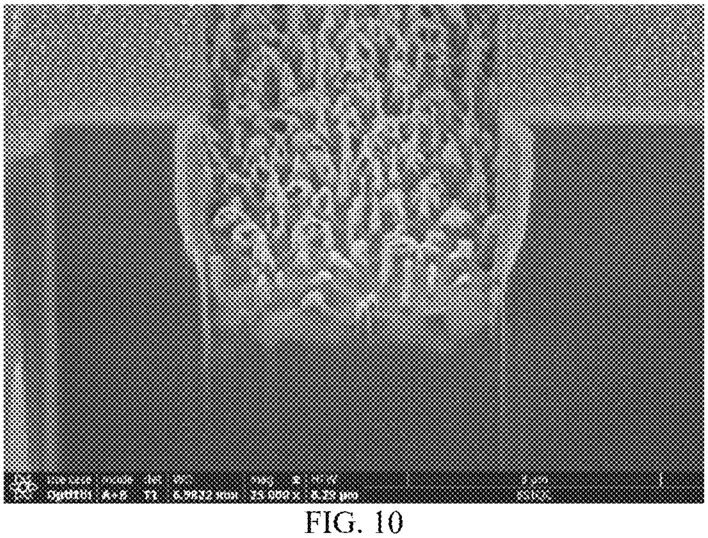
FIG. 10 is an SEM diagram of the structure shown in FIG. 8 not etched to the bottom of the dielectric layer.

It should be noted that not etching to the bottom of the dielectric layer has the advantage that the depth of the groove is not affected by the thickness of the dielectric layer and the process window is larger, but has the disadvantage that the etching quality at the bottom of the groove will decrease. The actual processing effect is shown in FIG. 9 and FIG. 10. Etching the bottom of the dielectric layer is shown in FIG. 9, and not etching the bottom of the dielectric layer is shown in FIG. 10. It can be seen that the unevenness at the bottom of the dielectric layer in FIG. 10 is more obvious.

In the process for fabricating the transparent antenna provided in the embodiments of the present application, the butterfly shaped groove is formed in the filling layer by the current semiconductor process, which not only effectively protects the material in the groove from being etched in the vertical etching process, but also facilitate the fabrication of the thin metal wires. In addition, the butterfly shaped groove does not require high accuracy of the device exposure and etching, for example, an initial exposure line width is 5 μm. In the butterfly shaped groove, the line width at the opening of the groove may be narrowed to less than 2 μm, and the line width of the metal wire in the electrode layer depends on the line width at the opening of the groove. In this way, metal wires with thin line width and large thickness may be obtained, which exceeds the accuracy of the device exposure and etching, i.e., the butterfly shaped groove may break through the process limits of the device. That is, the present application provides a process for preparing thin metal wires by the butterfly shaped groove, which may effectively improve the existing processing accuracy and obtain a metal grid conductive film with better optical transparency.

It should be noted that this solution is not limited to the preparation of thin metal wires of 2 μm, and may be used to prepare patterns exceeding the device accuracy.

Optionally, as shown in FIGS. 11-14, after S51: forming the filling layer 5 on the surface of the mask layer 3 on the side away from the first substrate 1, in the second groove of the mask layer 3, and in the third groove of the dielectric layer 2, and before S411: forming the electrode layer 10 in the fourth groove k4 of the filling layer 5, the fabricating method further includes S01-S02.

In S01, a leveling layer 7 is formed at least in the fourth groove k4 of the filling layer 5.

The above forming the leveling layer at least in the fourth groove of the filling layer refers to forming the leveling layer only in the fourth groove of the filling layer; alternatively, in addition to forming the leveling layer in the fourth groove of the filling layer, forming the leveling layer in other structures.

A material of the leveling layer is not specifically limited. Exemplarily, the material of the leveling layer may include organic material with a lower viscosity and a weaker deformation. Optionally, the material of the leveling layer may be organic adhesive material with high light transmittance.

In S02, the leveling layer 7 is processed to at least partially fill the groove between the second filling portion 512 and the fourth filling portion 532.

Figure 11:
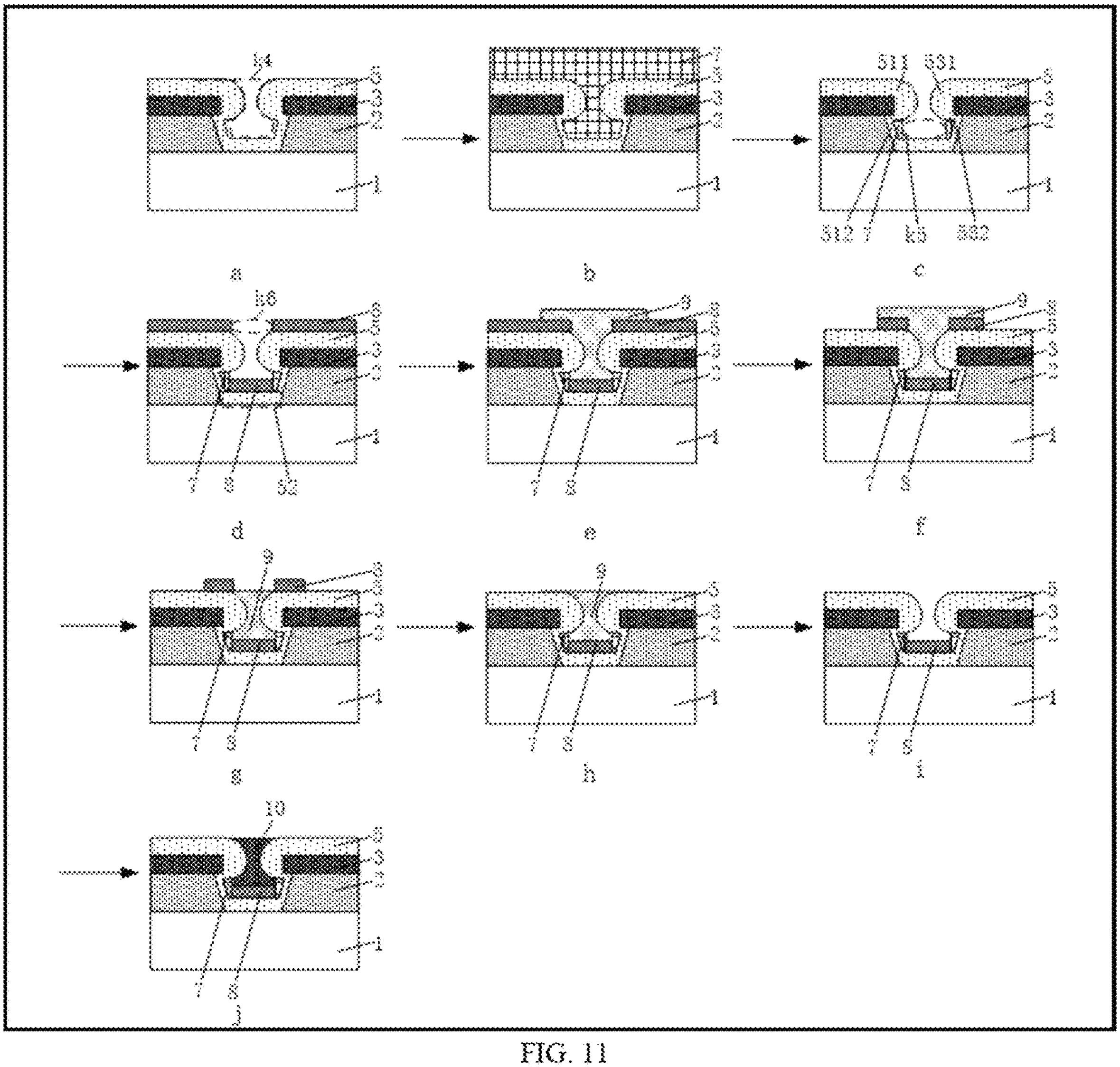
FIG. 11*a*-FIG. 11*j* are flowcharts of a method for fabricating a first transparent antenna provided in an embodiment of the present application.
Figure 12:
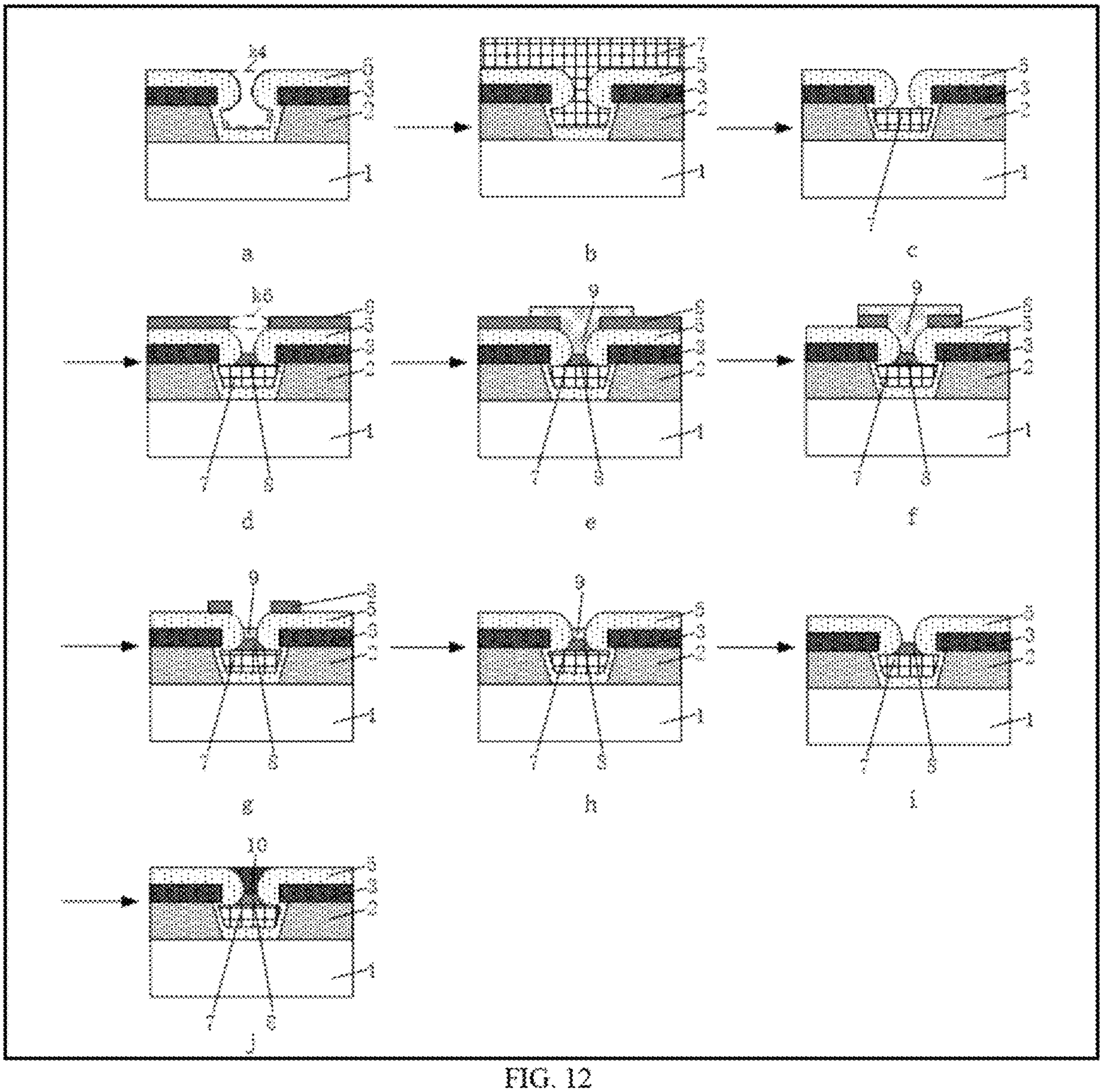
FIG. 12*a*-FIG. 12*j* are flowcharts of a method for fabricating a second transparent antenna provided in an embodiment of the present application.

The above processing the leveling layer to at least partially fill the groove between the second filling portion and the fourth filling portion refers to: processing the leveling layer to partially fill the groove between the second filling portion and the fourth filling portion; alternatively, processing the leveling layer to fully fill the groove between the second filling portion and the fourth filling portion. Panel c of FIG. 11 shows processing the leveling layer 7 to be located between the first filling portion 511, the third filling portion 531 and the first substrate 1 as an example. Panel c of FIG. 12 shows processing the leveling layer to fully fill the groove between the second filling portion and the fourth filling portion as an example.

S411: forming the electrode layer 10 in the fourth groove k4 of the filling layer 5 includes:

S03: forming the electrode layer 10 at least in the groove between the first filling portion 511 and the third filling portion 531.

The above forming the electrode layer at least in the groove between the first filling portion and the third filling portion refers to: forming the electrode layer only in the groove between the first filling portion and the third filling portion; alternatively, in addition to forming the electrode layer in the groove between the first filling portion and the third filling portion, forming the electrode layer at other positions which is not specifically limited.

In the method for fabricating the transparent antenna provided in the embodiments of the present application, a leveling effect can be achieved by forming the leveling layer on the electrode layer. Due to the unevenness of metal for electroplating the electrode layer, part of the groove is not filled, and the metal surface morphology of the electroplated electrode layer is uneven. Thus, it is necessary to use the leveling layer for flattening to avoid the metal surface morphology of the electrode layer from affecting the transmittance.

Optionally, as shown in FIG. 11, S01: forming the leveling layer 7 at least in the fourth groove k4 of the filling layer 5 includes:

S011: forming the leveling layer 7 on the surface of the filling layer 5 on the side away from the first substrate 1, and in the fourth groove k4 of the filling layer 5.

S02: processing the leveling layer 7 to at least partially fill the groove between the second filling portion 512 and the fourth filling portion 532 includes:

S021: processing the leveling layer 7 to be located between the first filling portion 511 and the first substrate 1, between the third filling portion 531 and the first substrate 1, and have a fifth groove k5.

S03: forming the electrode layer 10 at least in the groove between the first filling portion 511 and the third filling portion 531 includes:

S031: forming the electrode layer 10 in the groove between the first filling portion 511 and the third filling portion 531 and in the fifth groove k5.

In the method for fabricating the transparent antenna provided in the embodiments of the present application, the line width of the metal wire may be determined by the line width at the opening of the groove, so that a metal wire with thin line width and large thickness may be obtained, which exceeds the limitations of device exposure accuracy, etching accuracy, etc., and has a wide range of application.

Optionally, as shown in FIG. 11, after S021: processing the leveling layer 7 to be located between the first filling portion 511 and the first substrate 1, between the third filling portion 531 and the first substrate 1, and have the fifth groove k5, and before S031: forming the electrode layer 10 in the groove between the first filling portion 511 and the third filling portion 531 and in the fifth groove k5, the fabricating method further includes S04-S09.

In S04, a seed layer 8 is formed in part of the fifth groove k5, and on a side of the first filling portion 511 and the third filling portion 531 away from the first substrate 1.

The seed layer 8 in the fifth groove k5 is in contact with the second sub-filling layer 52; and the seed layer 8 on the side of the first filling portion 511 and the third filling portion 531 away from the first substrate 1 has a sixth groove k6.

A material of the above seed layer is not specifically limited. Exemplarily, the material of the above seed layer may include metals or metal alloys or metal oxides such as copper (Cu), silver (Ag), molybdenum and copper alloy (Mo/Cu), indium tin oxide and silver alloy (ITO/Ag), etc. Optionally, the material of the seed layer may be copper or silver.

The above process for fabricating the seed layer is not specifically limited. Exemplarily, the seed layer may be formed by sputter. It should be noted the seed layer may be not provided, but the process for fabricating the electrode layer may be changed.

In S05, a third photoresist 9 is formed in the fifth groove k5, in the groove between the first filling portion 511 and the third filling portion 531, in the sixth groove k6, and on the surface of the seed layer 8 on the side away from the first substrate 1.

The above process for fabricating the third photoresist is not specifically limited. Exemplarily, the third photoresist may be spin-coated, exposed and developed for patterning. The size of the exposed pattern is larger than that of the exposed pattern before etching, so as to reduce the difficulty of photolithography alignment.

In S06, the seed layer 8 on the side of the first filling portion 511 and the third filling portion 531 away from the first substrate 1 is processed to be located between the third photoresist 9 and the first filling portion 511 and the third filling portion 531.

Exemplarily, the seed layer which is not protected by the third photoresist may be removed by wet etching.

In S07, the third photoresist 9 is processed to be located in the fifth groove k5, and the groove between the first filling portion 511 and the third filling portion 531.

The above process for processing the third photoresist is not specifically limited. Exemplarily, the third photoresist may be processed by RIE.

In S08, the seed layer 8 on the side of the first filling portion 511 and the third filling portion 531 away from the first substrate 1 is removed.

The above process for removing the seed layer on the side of the first filling portion and the third filling portion away from the first substrate is not specifically limited. Exemplarily, the seed layer outside the groove may be removed by wet etching.

In S09, the third photoresist 9 is removed.

The process for removing the third photoresist is not specifically limited. Exemplarily, the third photoresist may be peeled off.

S031: forming the electrode layer 10 in the groove between the first filling portion 511 and the third filling portion 531 includes:

S0311: forming the electrode layer 10 on the seed layer 8.

The electrode layer 10 is located in the fifth groove k5, and in the groove between the first filling portion 511 and the third filling portion 531.

The above process for forming the electrode layer is not specifically limited. Exemplarily, the electrode layer may be formed by electroplating.

In the method for fabricating the transparent antenna provided in the embodiments of the present application, on the one hand, forming the seed layer before forming the electrode layer is favorable to the subsequent fabrication of the electrode layer, and especially favorable to the later electroplating the electrode layer with thicker metal; on the other hand, the remaining area of the third photoresist after photolithography is small, and in the case of a metal grid, for example, the remaining is generally not more than 5%.

Figure 13:
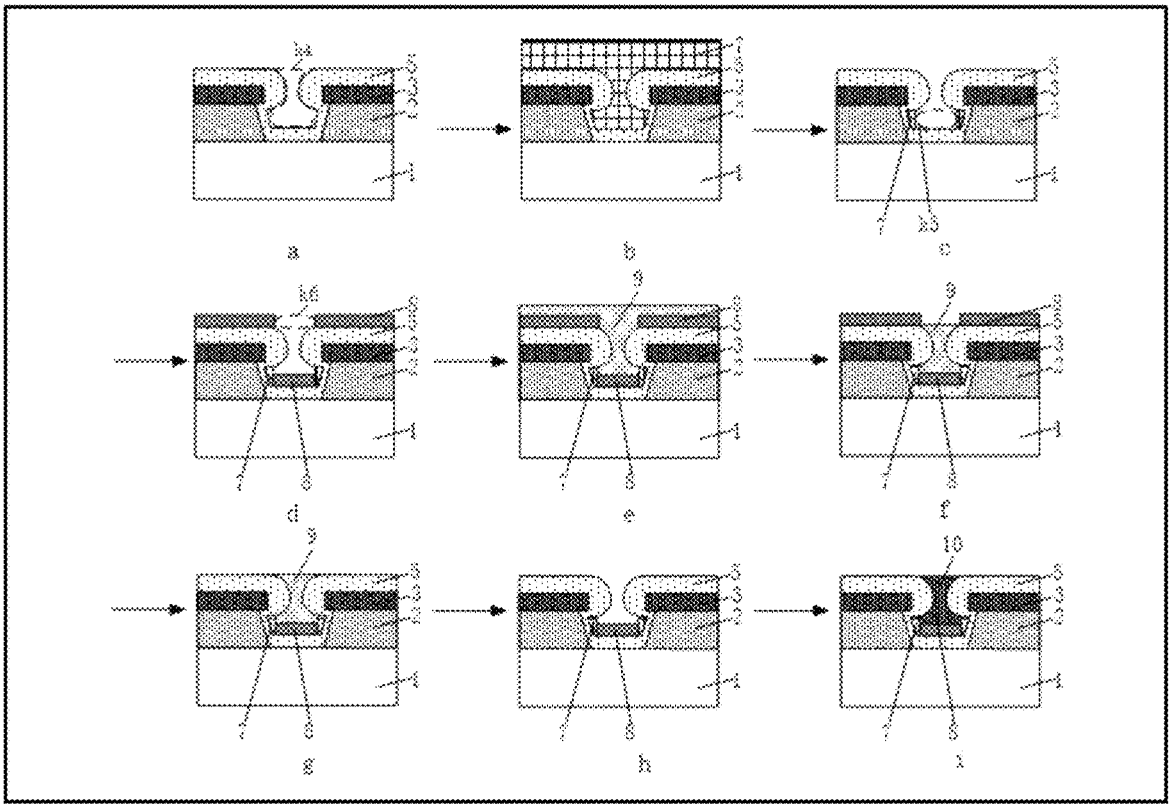
FIG. 13*a*-FIG. 13*i* are flowcharts of a method for fabricating a third transparent antenna provided in an embodiment of the present application.

Optionally, as shown in FIG. 13, after S021: processing the leveling layer 7 to be located between the first filling portion 511 and the first substrate 1, between the third filling portion 531 and the first substrate 1, and have the fifth groove k5, and before S031: forming the electrode layer in the groove between the first filling portion 511 and the third filling portion 531, and in the fifth groove k5 10, the fabricating method further includes S04 and S10-13.

In S04, the seed layer 8 is formed in part of the fifth groove k5, and on the side of the first filling portion 511 and the third filling portion 531 away from the first substrate 1.

The seed layer 8 in the fifth groove k5 is in contact with the second sub-filling layer 52; and the seed layer 8 on the side of the first filling portion 511 and the third filling portion 531 away from the first substrate 1 has the sixth groove k6.

In S10, the third photoresist 9 is formed in the fifth groove k5, in the groove between the first filling portion 511 and the third filling portion 531, in the sixth groove k6, and on the surface of the seed layer 8 on the side away from the first substrate 1.

In S11, the third photoresist 9 is processed to be located in the fifth groove k5, and in the groove between the first filling portion 511 and the third filling portion 531.

In S12, the seed layer 8 on the side of the first filling portion 511 and the third filling portion 531 away from the first substrate 1 is removed.

In S13, the third photoresist 9 is removed.

S031: forming the electrode layer 10 in the groove between the first filling portion 511 and the third filling portion 531 includes:

S0311: forming the electrode layer 10 on the seed layer 8.

The electrode layer 10 is located in the fifth groove k5, and in the groove between the first filling portion 511 and the third filling portion 531.

In the method for fabricating the transparent antenna provided in the embodiments of the present application, the photolithography step as shown in panel f of FIG. 11 is omitted based on FIG. 11, i.e., in the present application, the third photoresist is coated without exposure and development, and directly etched by RIE. The third photoresist outside the groove is removed by controlling the etching time, etc., so that the use of an exposure machine and the process cost are reduced.

Figure 14:
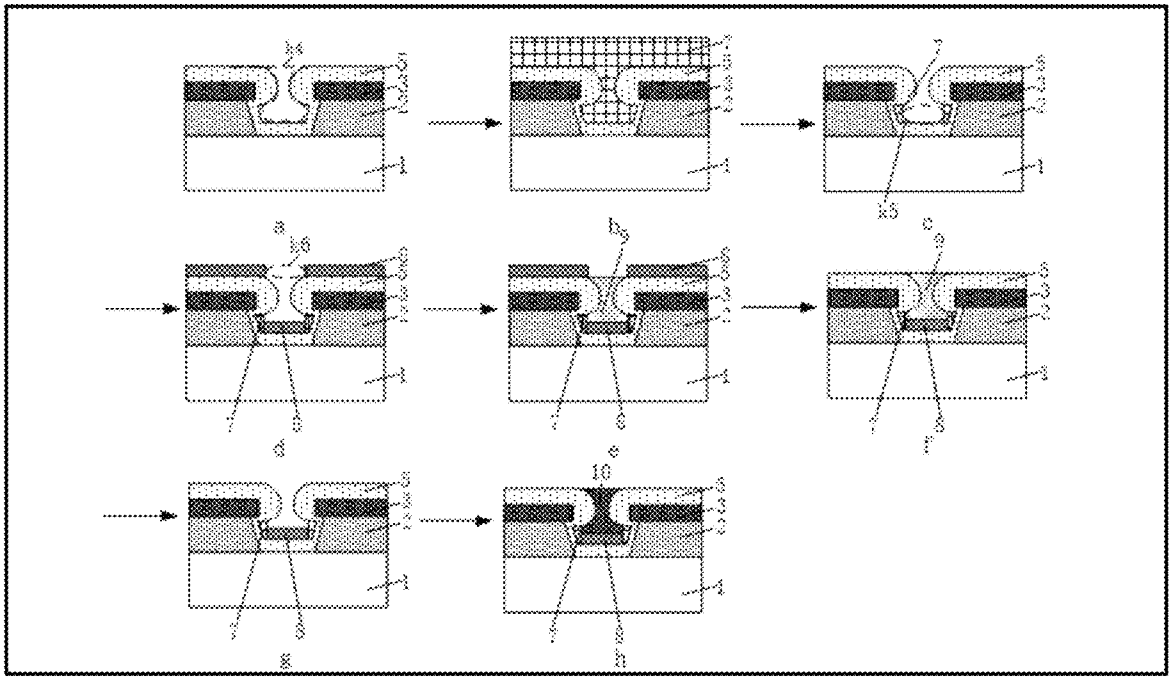
FIG. 14*a*-FIG. 14*h* are flowcharts of a method for fabricating a fourth transparent antenna provided in an embodiment of the present application.

Optionally, as shown in FIG. 14, after S021: processing the leveling layer 7 to be located between the first filling portion 511 and the first substrate 1, between the third filling portion 531 and the first substrate 1, and have the fifth groove k5, and before S031: forming the electrode layer 10 in the groove between the first filling portion 511 and the third filling portion 531, and in the fifth groove k5 10, the fabricating method further includes S04 and S014-S016.

In S04, the seed layer 8 is formed in part of the fifth groove k5, and on the side of the first filling portion 511 and the third filling portion 531 away from the first substrate 1.

The seed layer 8 in the fifth groove k5 is in contact with the second sub-filling layer 52; and the seed layer 8 on the side of the first filling portion 511 and the third filling portion 531 away from the first substrate 1 has the sixth groove k6.

In S014, the third photoresist 9 is formed in the fifth groove k5, and in the groove between the first filling portion 511 and the third filling portion 531.

In S015, the seed layer 8 on the side of the first filling portion 511 and the third filling portion 531 away from the first substrate is removed.

In S016, the third photoresist 9 is removed.

S031: forming the electrode layer 10 in the groove between the first filling portion 511 and the third filling portion 531 includes:

S0311: forming the electrode layer 10 on the seed layer 8.

The electrode layer 10 is located in the fifth groove k5, and in the groove between the first filling portion 511 and the third filling portion 531.

In the method for fabricating the transparent antenna provided in the embodiments of the present application, the etching of the seed layer outside the groove is directly accomplished by one photolithography, which may reduce the number of process steps, especially the number of dry etching (copper (Cu) etching), greatly save the cost, and reduce environmental pollution caused by copper etching solution.

Optionally, as shown in FIG. 12, S01: forming the leveling layer 7 at least in the fourth groove k4 of the filling layer 5 includes:

S010: forming the leveling layer 7 on a side of the filling layer 5 away from the first substrate 1, and in the fourth groove k4 of the filling layer 5.

S017: processing the leveling layer 7 to at least partially fill the groove between the second filling portion 512 and the fourth filling portion 532 includes:

S018: processing the leveling layer 7 to fully fill the groove between the second filling portion 512 and the fourth filling portion 532.

S03: forming the electrode layer 10 at least in the groove between the first filling portion 511 and the third filling portion 531 includes:

S031: forming the electrode layer 10 in the groove between the first filling portion 511 and the third filling portion 531.

In the method for fabricating the transparent antenna provided in the embodiments of the present application, during etching the leveling material, the etching time may be controlled to etch to a lower edge of the butterfly shaped groove, so that lateral etching may be almost completely avoided, and the line width of metal wire may be further reduced.

Optionally, as shown in FIG. 12, after S018: processing the leveling layer 7 to fully fill the groove between the second filling portion 512 and the fourth filling portion 532, and before S031: forming the electrode layer 10 in the groove between the first filling portion 511 and the third filling portion 531, and in the fifth groove k5, the fabricating method further includes S019-S024.

In S019, the seed layer 8 is formed on the leveling layer 7, and the side of the first filling portion 511 and the third filling portion 531 away from the first substrate.

The seed layer 8 on the leveling layer 7 is partially located in the groove between the first filling portion 511 and the third filling portion 531, and the seed layer 8 on the side of the first filling portion 511 and the third filling portion 531 away from the first substrate 1 have the sixth groove k6.

In S020, the third photoresist 9 is formed in the groove between the first filling portion 511 and the third filling portion 531, in the sixth groove k6, and on part of the surface of the seed layer 8 on the side away from the first substrate 1.

In S021, the seed layer on the side of the first filling portion 511 and the third filling portion 531 away from the first substrate 1 is processed to retain the seed layer 8 between the third photoresist 9 and the first filling portion 511 and the third filling portion 531.

In S022, the third photoresist 9 is processed to be located in part of the groove between the first filling portion 511 and the third filling portion 531.

In S023, the seed layer 8 on the side of the first filling portion 511 and the third filling portion 531 away from the first substrate 1 is removed.

In S024, the third photoresist 9 is removed.

S031: forming the electrode layer 10 in the groove between the first filling portion 511 and the third filling portion 531 includes:

S0311: forming the electrode layer 10 on the seed layer 8.

The electrode layer 10 is located in the groove between the first filling portion 511 and the third filling portion 531.

In the method for fabricating the transparent antenna provided in the embodiments of the present application, during etching the leveling material, the etching time may be controlled to etch to a lower edge of the butterfly shaped opening, so that lateral etching may be completely avoided, and the line width of metal wire may be further reduced.

As shown in FIG. 2, a method for fabricating a first groove of a defining layer in a first transparent antenna is provided.

In S0011, as shown in FIG. 2*a*, a first substrate 1 is provided.

In S0012, as shown in FIG. 2*b*, organic adhesive material is coated and cured on the first substrate 1 to form a dielectric layer 2.

In S0013, as shown in FIG. 2*c*, SiON is deposited on the dielectric layer 2 to form a mask layer 3.

In S0014, as shown in FIG. 2*d*, transparent photoresist is deposited on the mask layer 3 and patterned to obtain a pattern of a first photoresist 4.

In S0015, as shown in FIG. 2*e*, the mask layer 3 is dry etched to form a second groove of the mask layer 3.

In S0016, as shown in FIG. 2*f*, the dielectric layer 2 is dry etched to form a third groove of the dielectric layer 2.

In S0017, as shown in FIG. 2*g*, the first photoresist 4 is removed.

In S0018, as shown in FIG. 2*h*, SiON material is deposited and processed in the second groove of the mask layer 3 and the third groove of the dielectric layer 2 to form a fourth groove (butterfly shaped groove) of a filling layer 5.

As shown in FIG. 4, a method for fabricating a first groove of a defining layer in a second transparent antenna is provided.

In S0021, as shown in FIG. 4*a*, a first substrate 1 is provided.

In S0022, as shown in FIG. 4*b*, COP is coated on the first substrate 1 to form a dielectric layer 2.

In S0023, as shown in FIG. 4*c*, SiON is deposited on the dielectric layer 2 to form a mask layer 3.

In S0024, as shown in FIG. 4*d*, transparent photoresist is deposited and patterned on the mask layer 3 to obtain a pattern of a first photoresist 4.

In S0025, as shown in FIG. 4*e*, the mask layer 3 is dry etched to form a second groove of the mask layer 3.

In S0026, as shown in FIG. 4*f*, the dielectric layer 2 is dry etched to form a third groove of the dielectric layer 2.

In S0027, as shown in FIG. 4*g*, the first photoresist 4 is removed.

In S0028, as shown in FIG. 4*h*, SiON material is deposited and processed in the second groove of the mask layer 3 and the third groove of the dielectric layer 2 to form a fourth groove (butterfly shaped groove) of a filling layer 5.

In S0029, as shown in FIG. 4*i*, the first substrate 1 is removed.

As shown in FIG. 5, a method for fabricating a first groove of a defining layer in a third transparent antenna is provided.

In S0031, as shown in FIG. 5*a*, the first substrate 1 is provided.

In S0032, as shown in FIG. 5*b*, organic adhesive material is coated and cured on the first substrate 1 to form a dielectric layer 2.

In S0033, as shown in FIG. 5*c*, SiON is deposited on the dielectric layer 2 to form a mask layer 3.

In S0034, as shown in FIG. 5*d*, transparent photoresist is deposited on the mask layer 3 and patterned to obtain a pattern of a first photoresist 4.

In S0035, as shown in FIG. 5*e*, the mask layer 3 is wet etched to form a second groove of the mask layer 3.

In S0036, as shown in FIG. 5*f*, the first photoresist 4 is removed.

In S0037, as shown in FIG. 5*g*, transparent photoresist is deposited on the mask layer 3 and patterned by RIE to obtain a pattern of a second photoresist 6 and a third groove of the dielectric layer 2.

In S0038, as shown in FIG. 5*h*, the second photoresist 6 is removed.

In S0039, as shown in FIG. 5*i*, SiON material is deposited and processed in the second groove of the mask layer 3 and the third groove of the dielectric layer 2 to form a fourth groove (butterfly shaped groove) of a filling layer 5.

Figure 6:
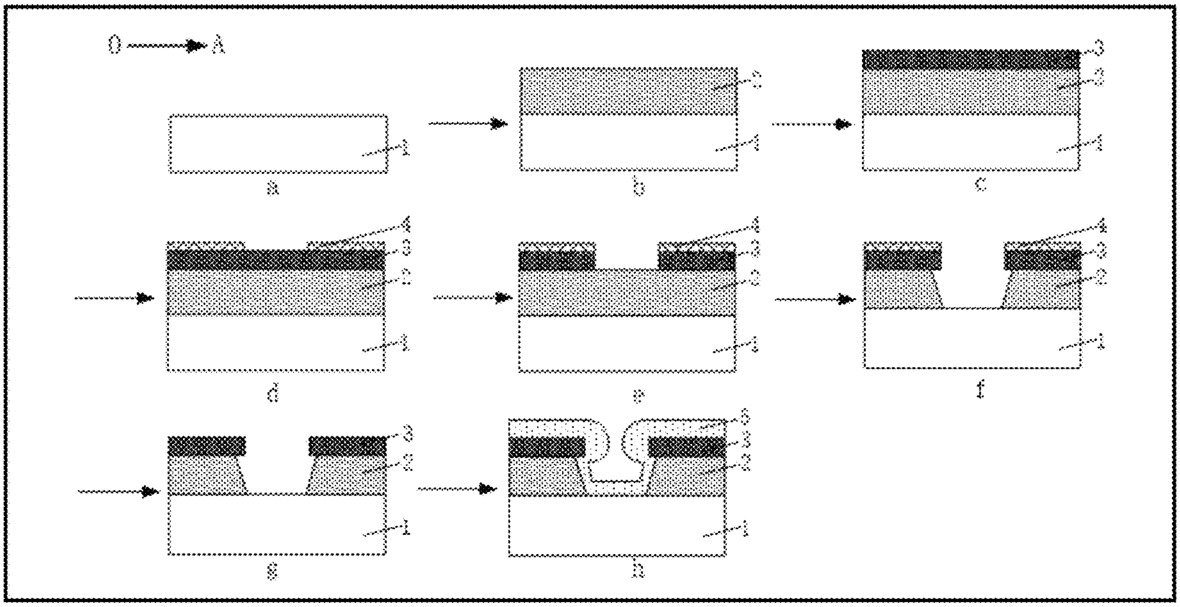
FIG. 6*a*-FIG. 6*h* are flowcharts of a method for fabricating a groove of a fifth transparent antenna provided in an embodiment of the present application.

As shown in FIG. 6, a method for fabricating a first groove of a defining layer in a fourth transparent antenna is provided.

In S0041, as shown in FIG. 6*a*, a first substrate 1 is provided.

In S0042, as shown in FIG. 6*b*, organic adhesive material is coated and cured on the first substrate 1 to form a dielectric layer 2.

In S0043, as shown in FIG. 6*c*, SiON is deposited on the dielectric layer 2 to form a mask layer 3.

In S0044, as shown in FIG. 6*d*, transparent photoresist is deposited on the mask layer 3 and patterned to obtain a pattern of a first photoresist 4.

In S0045, as shown in FIG. 6*e*, the mask layer 3 is wet etched to form a second groove of the mask layer 3.

In S0046, as shown in FIG. 6*f*, the first photoresist 4 and the dielectric layer 2 are patterned by RIE to obtain a third groove of the dielectric layer 2.

In S0047, as shown in FIG. 6*g*, the first photoresist 4 is removed.

In S0048, as shown in FIG. 6*h*, SiON material is deposited and processed in the second groove of the mask layer 3 and the third groove of the dielectric layer 2 to form a fourth groove (butterfly shaped groove) of a filling layer 5.

As shown in FIG. 11, a method for fabricating a first transparent antenna is provided.

In S0050, as shown in FIG. 11*a*, a structure with the fourth groove k4 is provided.

In S0051, as shown in FIG. 11*b*, organic adhesive material is leveled in the fourth groove k4 and on a side of the filling layer 5 away from the first substrate 1 to form a leveling layer 7.

In S0052, as shown in FIG. 11*c*, the leveling layer 7 is etched by RIE, so that the leveling layer 7 is located between a first filling portion 511, a second filling portion 531 and the first substrate 1.

In S0053, as shown in FIG. 11*d*, a metal seed layer 8 is deposited in part of a fifth groove k5, and on the side of the filling layer 5 away from the first substrate 1.

In S0054, as shown in FIG. 11*e*, a third photoresist 9 is spin-coated and patterned in the fifth groove k5, in a groove between the first filling portion 511 and the third filling portion 531, in a sixth groove k6, and on part of a surface of the metal seed layer 8 on the side away from the first substrate 1.

In S0055, as shown in FIG. 11*f*, the metal seed layer 8 unprotected by the third photoresist 9 is removed by wet etching.

In S0056, as shown in FIG. 11*g*, the third photoresist 9 outside the fifth groove k5 and the groove between the first filling portion 511 and the third filling portion 531 is removed by RIE etching.

In S0057, as shown in FIG. 11*h*, the metal seed layer 8 outside the fifth groove k5 and the groove between the first filling portion 511 and the third filling portion 531 is removed by RIE etching.

In S0058, as shown in FIG. 11*i*, the third photoresist 9 is peeled off.

In S0059, as shown in FIG. 11*j*, thick metal is electroplated to obtain an electrode layer with fine line width and large thickness.

It should be noted that the material of the seed layer and the material of the electrode layer may be the same or different, and are not specifically limited.

As shown in FIG. 12, a method for fabricating a second transparent antenna is provided.

In S0060, as shown in FIG. 12*a*, a structure with the fourth groove k4 is provided.

In S0061, as shown in FIG. 12*b*, organic adhesive material is leveled in the fourth groove k4 and on a side of the filling layer 5 away from the first substrate 1 to form a leveling layer 7.

In S0062, as shown in FIG. 12*c*, the leveling layer 7 is etched by RIE, so that the leveling layer 7 is located in all of a groove between a second filling portion 512 and a fourth filling portion 532.

In S0063, as shown in FIG. 12*d*, a metal seed layer 8 is deposited in part of a groove between a first filling portion 511 and a third filling portion 531, and on the side of the filling layer 5 away from the first substrate 1.

In S0064, as shown in FIG. 12*e*, a third photoresist 9 is spin-coated and patterned in part of the groove between the first filling portion 511 and the third filling portion 531, in a sixth groove, and on part of a surface of the filling layer 8 on the side away from the first substrate 1.

In S0065, as shown in FIG. 12*f*, the metal seed layer 8 unprotected by the third photoresist 9 is removed by wet etching.

In S0066, as shown in FIG. 12g, the third photoresist 9 outside the fifth groove k5 and the groove between the first filling portion 511 and the third filling portion 531 is removed by RIE etching.

In S0067, as shown in FIG. 12h, the metal seed layer 8 outside the fifth groove k5 and the groove between the first filling portion 511 and the third filling portion 531 is removed by RIE etching.

In S0068, as shown in FIG. 12i, the third photoresist 9 is peeled off.

In S0069, as shown in FIG. 12j, thick metal is electroplated to obtain an electrode layer 10 with thin line width and large thickness.

As shown in FIG. 13, a method for fabricating a third transparent antenna is provided.

In S0070, as shown in FIG. 13a, a structure with the fourth groove k4 is provided.

In S0071, as shown in FIG. 13b, organic adhesive material is leveled in the fourth groove k4 and on a side of the filling layer 5 away from the first substrate 1 to form a leveling layer 7.

In S0072, as shown in FIG. 13c, the leveling layer 7 is etched by RIE, so that the leveling layer 7 is located between a first filling portion 511, a second filling portion 531 and the first substrate 1.

In S0073, as shown in FIG. 13d, a metal seed layer 8 is deposited in part of a fifth groove k5, and on a side of the filling layer 5 away from the first substrate 1.

In S0074, as shown in FIG. 13e, a third photoresist 9 is spin-coated and patterned in the fifth groove k5, in a groove between the first filling portion 511 and the third filling portion 531, in a sixth groove k6, and on an entire surface of the metal seed layer 8 on a side away from the first substrate 1.

In S0075, as shown in FIG. 13f, the third photoresist 9 outside the fifth groove k5 and the groove between the first filling portion 511 and the third filling portion 531 is removed by RIE etching.

In S0076, as shown in FIG. 13g, the metal seed layer 8 outside the fifth groove k5 and the groove between the first filling portion 511 and the third filling portion 531 is removed.

In S0077, as shown in FIG. 13h, the third photoresist 9 is peeled off.

In S0078, as shown in FIG. 13i, thick metal is electroplated to obtain an electrode layer with thin line width and large thickness.

As shown in FIG. 14, a method for fabricating a fourth transparent antenna is provided.

In S0080, as shown in FIG. 14a, a structure with the fourth groove k4 is provided.

In S0081, as shown in FIG. 14b, organic adhesive material is leveled in the fourth groove k4 and on a side of the filling layer 5 away from the first substrate 1 to form a leveling layer 7.

In S0082, as shown in FIG. 14c, the leveling layer 7 is etched by RIE, so that the leveling layer 7 is located between a first filling portion 511, a second filling portion 531 and the first substrate 1.

In S0083, as shown in FIG. 14d, a metal seed layer 8 is deposited in part of a fifth groove k5 and on the side of the filling layer 5 away from the first substrate 1.

In S0084, as shown in FIG. 14e, a third photoresist 9 is spin-coated in part of the fifth groove k5 and in a groove between the first filling portion 511 and the third filling portion 531.

In S0085, as shown in FIG. 14f, the metal seed layer 8 on the side of the filling layer 5 away from the first substrate 1 is removed by wet etching.

In S0086, as shown in FIG. 14g, the third photoresist 9 is peeled off.

In S0087, as shown in FIG. 14h, thick metal is electroplated to obtain an electrode layer 10 with thin line width and large thickness.

The embodiments of the present application further provide a transparent antenna fabricated by the above method for fabricating the transparent antenna. As shown in FIG. 2 and panel j of FIG. 11, the transparent antenna includes a first substrate 1; a defining layer provided on the first substrate 1, where the defining layer has a first groove, an opening width D1 in a first direction (the OA direction shown in the figure) of the first groove k1 at a first distance R1 between the first groove k1 and the first substrate 1 along a direction perpendicular to the first substrate 1 is less than an opening width D2 in the first direction of the first groove k1 at a second distance R2 between the first groove k1 and the first substrate 1, the first distance R1 is greater than the second distance R2, and the first direction (the OA direction shown in the figure) is parallel to the first substrate 1; an electrode layer 10 provided in the groove of the defining layer, where the electrode layer 10 includes a radiation pattern and a feeder line which include a grid linear structure.

In the transparent antenna provided in the embodiments of the present application, on the one hand, the electrode layer with a high depth-to-width ratio, that is, a metal wire with a high depth-to-width ratio, may be obtained by controlling the thickness of the electrode layer in the direction perpendicular to the first substrate by the thickness of the first groove of the defining layer along the direction perpendicular to the first substrate, and controlling the width of the electrode layer along the direction parallel to the first substrate by the width of the first groove of the defining layer along the direction parallel to the first substrate. Since the first groove of the defining layer is along the direction perpendicular to the first substrate, the opening width of the first groove in the first direction where the spacing between the first groove and the first substrate is the first distance is less than the opening width of the first groove in the first direction where the spacing between the first groove and the first substrate is the second distance, and the first distance is greater than the second distance, so that the electrode layer may be further narrowed along a direction away from the first substrate, and the electrode layer which is thinner along the first direction may be obtained, i.e., the radiation pattern and the feed line in the transparent antenna have a higher depth-to-width ratio, the transparent antenna may radiate efficiently, and when the transparent antenna with extremely thin line widths of metal wires is applied to the electronic device, such as integrated in the display device, the influence on the display function of the display device may be greatly reduced or even eliminated. On the other hand, the light transmittance of the electrode layer may be effectively improved by setting the radiation pattern and the feed line as grid linear structures, so that the transparent antenna as a whole has a transparent effect with excellent light transmittance, and the range of light transmittance may reach 86-92%, which is more conductive to application in the display device.

Optionally, as shown in FIG. 2 and panel j of FIG. 11, the defining layer includes a mask layer 3 and a dielectric layer 2. The dielectric layer 2 is provided between the mask layer 3 and the first substrate 1. The mask layer 3 has a second groove, and the dielectric layer 2 has a third groove. An opening width of at least part of the second groove in a first direction (the OA direction shown in the figure) is less than the opening width of the third groove in the first direction (the OA direction shown in the figure). The electrode layer 10 is provided in the second groove and the third groove.

In the transparent antenna provided in the embodiments of the present application, since the electrode layer is provided in the second groove of the mask layer and the third groove of the dielectric layer, the electrode layer with a high depth-to-width ratio, that is, a metal wire with a high depth-to-width ratio, may be obtained by controlling the thickness of the electrode layer in the direction perpendicular to the first substrate by the thicknesses of the second groove of the mask layer and the third groove of the dielectric layer along the direction perpendicular to the first substrate, and controlling the width of the electrode layer along the direction parallel to the first substrate by the widths of the second groove of the mask layer and the third groove of the dielectric layer along the direction parallel to the first substrate. Since the opening width of at least part of the second groove in the first direction is less than the opening width of the third groove in the first direction, so that the electrode layer may be further narrowed along a direction away from the first substrate by the second groove of the mask layer, and the electrode layer which is thinner along the first direction may be obtained, i.e., the radiation pattern and the feed line in the transparent antenna have a higher depth-to-width ratio, the transparent antenna may radiate efficiently, and when the transparent antenna with extremely thin line width of metal wire is applied to the electronic device, such as integrated in the display device, the influence on the display function of the display device may be greatly reduced or even eliminated. On the other hand, the light transmittance of the electrode layer may be effectively improved by setting the radiation pattern and the feed line as grid linear structures, so that the transparent antenna as a whole has a transparent effect with excellent light transmittance, and the range of light transmittance may reach 86-92%, which is more conductive to application in the display device.

Optionally, as shown in FIG. 2 and panel j of FIG. 11, the defining layer further includes a filling layer 5. The filling layer 5 is provided on a surface of the mask layer 3 on a side away from the first substrate 1, in the second groove of the mask layer 3 and in the third groove of the dielectric layer 2. The filling layer 5 has a fourth groove. The electrode layer 10 is provided in the fourth groove.

In the transparent antenna provided in the embodiments of the present application, since the electrode layer is provided in the fourth groove of the filling layer, the electrode layer with a high depth-to-width ratio, that is, a metal wire with a high depth-to-width ratio, may be obtained by controlling the thickness of the electrode layer in the direction perpendicular to the first substrate by the thickness of the fourth groove of the filling layer along the direction perpendicular to the first substrate, and controlling the width of the electrode layer along the direction parallel to the first substrate by the width of the fourth groove of the filling layer along the direction parallel to the first substrate. Since the opening width of the fourth groove of the filling layer in the first direction is less than the opening width of the second groove in the first direction and the opening width of the third groove in the first direction, so that the electrode layer may be further narrowed along a direction away from the first substrate by the fourth groove of the filling layer, and the electrode layer which is thinner along the first direction may be obtained, i.e., the radiation pattern and the feed line in the transparent antenna have a higher depth-to-width ratio, the transparent antenna may radiate efficiently, and when the transparent antenna with extremely thin line widths of metal wires is applied to the electronic device, such as integrated in the display device, the influence on the display function of the display device may be greatly reduced or even eliminated. On the other hand, the light transmittance of the electrode layer may be effectively improved by setting the radiation pattern and the feed line as grid linear structures, so that the transparent antenna as a whole has a transparent effect with excellent light transmittance, and the range of light transmittance may reach 86-92%, which is more conductive to application in the display device.

Optionally, as shown in FIG. 2 and panel j of FIG. 11, the defining layer further includes a leveling layer 7 and a seed layer 8. The leveling layer 7 is provided in part of a groove between a second filling portion 521 and a fourth filling portion 532, and between the first filling portion 511, the third filling portion 531 and the first substrate. The leveling layer 7 has a fifth groove k5. The seed layer 8 is provided in part of the fifth groove k5. The electrode layer 10 is provided in part of the fifth groove k5, and in the groove between the first filling portion 511 and the third filling portion 531.

The leveling layer in the transparent antenna provided in the embodiments of the present application may play a leveling role. Due to the unevenness of metal for electroplating the electrode layer, part of the groove is not filled, and the metal surface morphology of the electroplated electrode layer is uneven. Thus, it is necessary to use the leveling layer for flattening to avoid the metal surface morphology of the electrode layer from affecting the transmittance. In addition, forming the seed layer before forming the electrode layer is favorable for subsequent fabricating the electrode layer, especially for the later electroplating the electrode layer with thick metal.

Optionally, as shown in FIG. 2 and panel j of FIG. 12, the defining layer further includes a leveling layer 7 and a seed layer 8. The leveling layer 7 is provided in all of a groove between a second filling portion 521 and a fourth filling portion 532. The seed layer 8 is provided in part of the groove between the first filling portion 511 and the third filling portion 531. The electrode layer 10 is provided in part of the groove between the first filling portion 511 and the third filling portion 531.

The leveling layer in the transparent antenna provided in the embodiments of the present application may play a leveling role. Due to the unevenness of the electroplating metal of the electrode layer, part of the groove is not filled, and the metal surface morphology of the electroplated electrode layer is uneven. Thus, it is necessary to use the leveling layer for flattening to avoid the metal surface morphology of the electrode layer from affecting the transmittance. In addition, forming the seed layer before forming the electrode layer is favorable for subsequent fabricating the electrode layer, especially for the later electroplating the electrode layer with thick metal.

The various structures of the transparent antenna in the embodiments of the present application may be obtained by the above methods for fabricating the transparent antenna, and will not be repeated here.

The embodiments of the present application further provide an electronic device including the above transparent antenna.

The above electronic device may be applied to a variety of glass substrate-based circuit scenarios, and is not specifically limited. The above electronic device may include a terminal electronic device, a base station antenna electronic device, an indoor miniaturized relay device, an outdoor miniaturized relay device, a portable device for satellite communication, a mobile communication device, and any other products or components with a function of transmitting and/or receiving electromagnetic waves. The above electronic device may also be applied to related electronic devices in other communication scenarios, etc. Products which have been promoted or have good promotion prospects include a mobile phone, a tablet, Wi-Fi (Wireless Fidelity), radar, etc.

In the electronic device provided in the embodiments of the present application, on the one hand, since the electrode layer is provided in the first groove of the defining layer, the electrode layer with a high depth-to-width ratio, that is, a metal wire with a high depth-to-width ratio, may be obtained by controlling the thickness of the electrode layer in the direction perpendicular to the first substrate by the thickness of the first groove of the defining layer along the direction perpendicular to the first substrate, and controlling the width of the electrode layer along the direction parallel to the first substrate by the width of the first groove of the defining layer along the direction parallel to the first substrate. Since the first groove of the defining layer is along the direction perpendicular to the first substrate, the opening width in the first direction of the first groove at the first distance between the first groove and the first substrate is less than the opening width in the first direction of the first groove at the second distance between the first groove and the first substrate, and the first distance is greater than the second distance, so that the electrode layer may be further narrowed along a direction away from the first substrate, and the electrode layer which is thinner along the first direction may be obtained, i.e., the radiation pattern and the feed line in the transparent antenna have a higher depth-to-width ratio, the transparent antenna may radiate efficiently, and when the transparent antenna with extremely thin line width of metal wire is applied to the electronic device, such as integrated in the display device, the influence on the display function of the display device may be greatly reduced or even eliminated. On the other hand, the light transmittance of the electrode layer may be effectively improved by setting the radiation pattern and the feed line as grid linear structures, so that the transparent antenna as a whole has a transparent effect with excellent light transmittance, and the range of light transmittance may reach 86-92%, which is more conductive to application in the display device.

Optionally, as shown in FIGS. 15-18, the electronic device includes a display device. The display device includes a display panel 20, which includes a display substrate 201 and the above transparent antenna TX provided on a light-emitting side of the display substrate 201.

The above display substrate may include an LCD (Liquid Crystal Display) substrate or an OLED (Organic Light-Emitting Diode) display substrate, which is not specifically limited.

The above transparent antenna is provided on the light-emitting side of the display substrate, and does not affect the display of the display substrate due to its transparency.

In the electronic device provided in the embodiments of the present application, since the electrode layer is provided in the first groove of the defining layer, the electrode layer with a high depth-to-width ratio, that is, a metal wire with a high depth-to-width ratio, may be obtained by controlling the thickness of the electrode layer in the direction perpendicular to the first substrate by the thickness of the first groove of the defining layer along the direction perpendicular to the first substrate, and controlling the width of the electrode layer along the direction parallel to the first substrate by the width of the first groove of the defining layer along the direction parallel to the first substrate. Since the first groove of the defining layer is along the direction perpendicular to the first substrate, the opening width in the first direction of the first groove at the first distance between the first groove and the first substrate is less than the opening width in the first direction of the first groove at the second distance between the first groove and the first substrate, and the first distance is greater than the second distance, so that the electrode layer may be further narrowed along a direction away from the first substrate, and the electrode layer which is thinner along the first direction may be obtained, i.e., the radiation pattern and the feed line in the transparent antenna have a higher depth-to-width ratio, the transparent antenna may radiate efficiently, and when the transparent antenna with extremely thin line width of the metal wire is applied to the electronic device, such as integrated in the display device, the influence on the display function of the display device may be greatly reduced or even eliminated.

Optionally, as shown in FIGS. 15-18, the display panel 20 further incudes a touch control layer 202, a first polarization unit 203 and a cover plate 204.

The touch control layer 202 is provided between the display substrate 201 and the transparent antenna TX; alternatively, the touch control layer 202 is provided on a side of the transparent antenna TX away from the display substrate 201.

The first polarization unit 203 is provided on the side of the transparent antenna TX away from the display substrate 201.

The cover plate 204 is provided on a side of the first polarization unit 203 away from the display substrate 201.

The structure of the above touch control layer is not limited. Exemplarily, the touch control layer may adopt a mutual-capacitance touch control structure or a self-capacitance touch control structure. The mutual-capacitance touch control structure or the self-capacitance touch control structure may be obtained according to relevant technology, and will not be described in detail here. Exemplarily, the structure of the touch control layer may include an FMLOC (Flexible Multi-Layer On Cell) touch control structure, which may reduce the thickness of the screen and facilitate folding. In addition, there is no bonding tolerance, so that the frame width may be reduced. The FMLOC structure may be obtained according to relevant technology, and will not be described in detail here.

The electronic device provided in the embodiments of the present application has a touch control layer which does not affect the normal operation of the antenna and may also realize the touch control function.

The material, type, etc. of the above first polarization unit are not specifically limited. Exemplarily, the material of the above first polarization unit may include PVA (polyvinyl alcohol) or PVC (polyvinyl chloride). Exemplarily, the type of the above first polarizing unit may include a line polarizer or a grating.

The material, structure, etc. of the above cover plate are not specifically limited. Exemplarily, the material of the above cover plate may include glass. Exemplarily, the above cover plate may include one layer; alternatively, it may also include multiple layers.

The electronic device provided in the embodiments of the present application has the first polarization unit, so that the polarization direction of light may be changed to achieve better display. In addition, because of the cover plate, the electronic device may protect the screen and prevent the screen from being scratched.

It should be noted that, as shown in FIGS. 15-18, the display panel 20 further includes a first bonding layer 202 between the touch control layer 202 and the transparent antenna TX, and a second bonding layer 206 between the first polarization unit 203 and the cover plate 204, which achieves better bonding between two adjacent layers. The materials of the above first bonding layer and the second bonding layer are not specifically limited. Exemplarily, the materials of the first bonding layer and the second bonding layer may both include highly transparent adhesive, such as OCA (Optically Clear Adhesive), etc.

Moreover, the first polarization unit may also be used as a cover plate.

Figure 15:
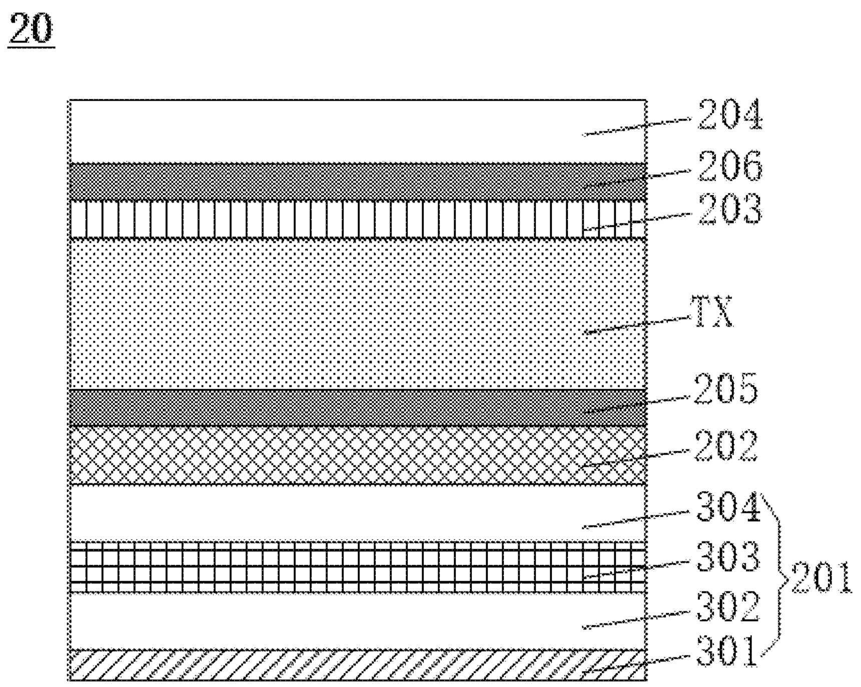
FIG. 15 is a schematic diagram of a structure of a first display panel provided in an embodiment of the present application.

As shown in FIG. 15, the display substrate 201 is an LCD, and may include a backlight source 301, a first glass substrate 302, a liquid crystal layer 303 and a second glass substrate 304 sequentially stacked, which form an antenna-on-LCD screen structure. The LCD may be a reflective LCD.

Figure 16:
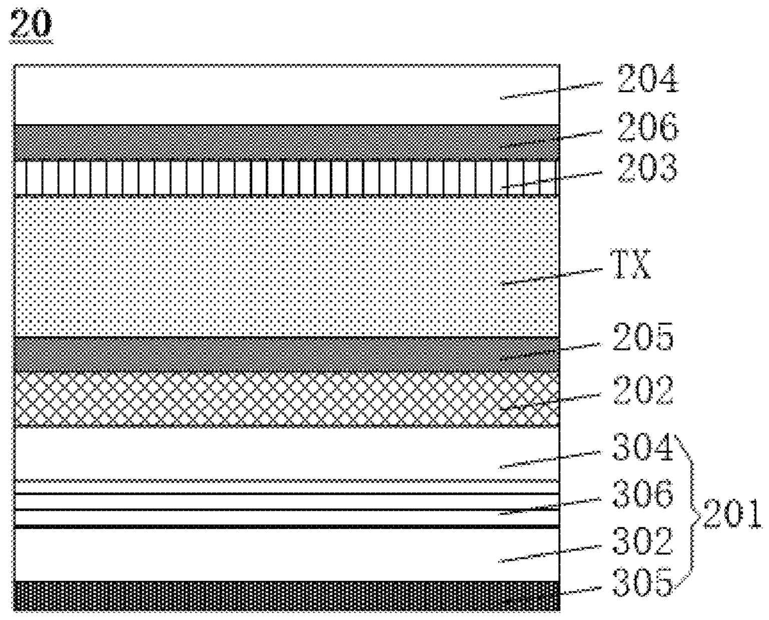
FIG. 16 is a schematic diagram of a structure of a second display panel provided in an embodiment of the present application.

As shown in FIG. 16, the display substrate 201 may include a metal heat dissipation film layer 305, a first glass substrate 302, an OLED 306 and a second glass substrate 304 sequentially stacked, which form an antenna-on-rigid OLED screen structure.

Figure 17:
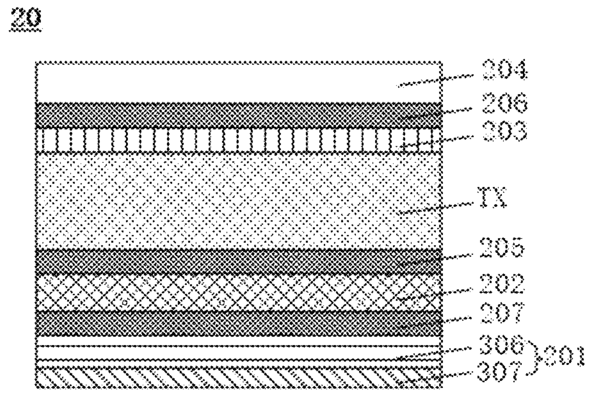
FIG. 17 is a schematic diagram of a structure of a third display panel provided in an embodiment of the present application.

As shown in FIG. 17, the display substrate 201 may include a flexible substrate 307 and an OLED 306 sequentially stacked, which is bonded to the touch control layer 202 through a third bonding layer 207. An antenna-on-flexible OLED (external touch control) screen structure is formed.

Figure 18:
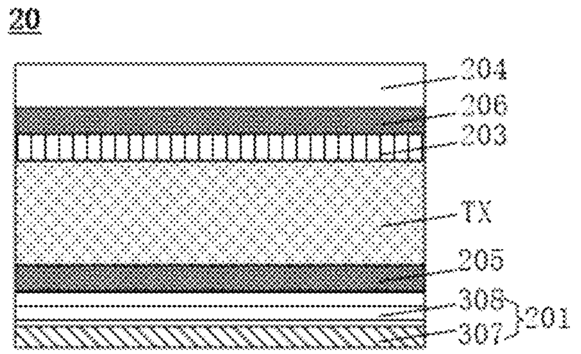
FIG. 18 is a schematic diagram of a structure of a fourth display panel provided in an embodiment of the present application.

As shown in FIG. 18, the display substrate 201 may include a flexible substrate 307 and an OLED 308 with integrated touch control function sequentially stacked, which form an antenna-on-flexible OLED (integrated touch control) screen structure.

Only the content related to the innovation point is presented here, and the rest of the structure may be obtained by referring to relevant technology, and will not be described in detail here.

Figure 19:
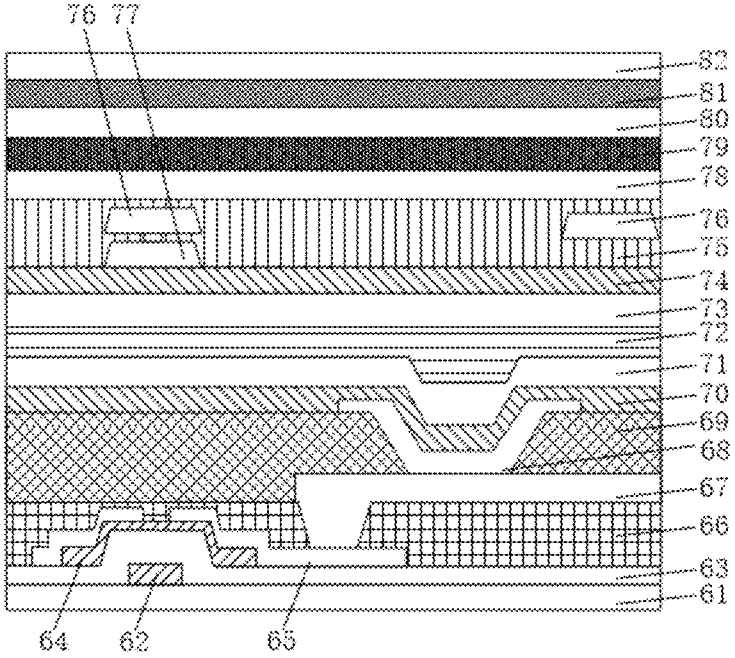
FIG. 19 is a schematic diagram of a structure of an LCD integrated millimeter wave antenna provided in an embodiment of the present application.

As shown in FIG. 19, an antenna-on-OLED (external touch control) screen structure is described in detail.

As shown in FIG. 19, a gate 62, a gate insulating layer 63, an active layer 64, a source-drain layer 65, a first flattening layer 66, an anode 67, a pixel-defining layer 68, an organic functional layer 69, a cathode 70, a first organic encapsulating layer 71, an inorganic encapsulating layer 72, a second organic encapsulating layer 73, a second buffer layer 74, a TSP touch control layer 75 (including a first metal 76 and second metal 77), a first OCA layer 78, a transparent antenna layer 79, a polarizer 80, a second OCA layer 81 and a glass cover 82 are sequentially stacked on a PI substrate 61.

Figure 20:
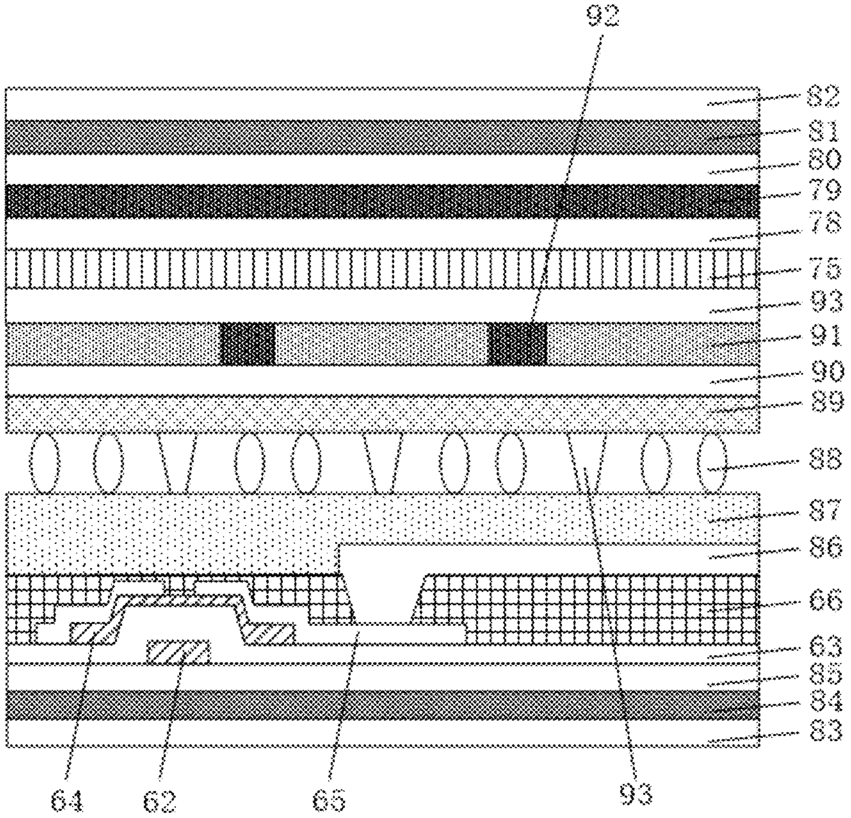
FIG. 20 is a schematic diagram of a structure of an OLED integrated millimeter wave antenna provided in an embodiment of the present application.

As shown in FIG. 20, an antenna-on-LCD screen structure is described in detail.

As shown in FIG. 20, a second polarizer 84, a first glass substrate 85, a gate 62, a gate insulating layer 63, an active layer 64, a source-drain layer 65, a first flattening layer 66, a first ITO layer 86, a first alignment film 87, a liquid crystal 88 and a spacer 93, a second alignment film 89, a second ITO layer 90, a color film layer 91, a black matrix 92, a second glass substrate 93, a TSP touch control layer 75, a first OCA layer 78, a transparent antenna layer 79, a polarizer 80, a second OCA layer 81 and a glass cover 82 are sequentially stacked on the backlight module 83.

Figure 21:
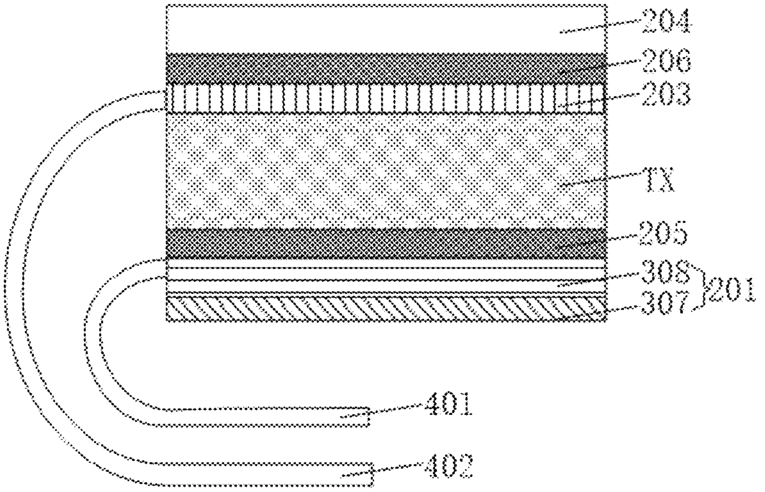
FIG. 21 is a schematic diagram of a structure of a fifth display panel provided in an embodiment of the present application.

Optionally, as shown in FIG. 21, the display device further includes a first controller 401 and a second controller 402, and the first controller 401 is electrically connected to the display substrate 201 and configured to control the display substrate 201.

The display panel includes a display region and a frame region connected to the display region. The transparent antenna TX is provided in the display region and the frame region, and the transparent antenna TX in the display region is a grid linear structure. The second controller 42 is electrically connected to the transparent antenna TX in the frame region, and is configured to control the transparent antenna TX.

The types of the first controller and the second controller are not specifically limited. Exemplarily, the first controller and the second controller may include a chip, such as FPC (Flexible Printed Circuit), PCB (Printed Circuit Boards), etc.

The method in which the first controller is electrically connected to the display substrate is not specifically limited. Exemplarily, the first controller and the display substrate may be directly electrically connected; alternatively, the first controller and the display substrate may be electrically connected through other structures.

The method in which the second controller is electrically connected to the transparent antenna is not specifically limited. Exemplarily, the second controller and the transparent antenna may be directly electrically connected; alternatively, the second controller and the transparent antenna may be electrically connected through other structures.

In the display device provided in the embodiments of the present application, the first controller and the second controller may control operations of the display substrate and the transparent antenna respectively, so that the RF chip and the connection board of the antenna may be used separately without being integrated with the display chip (the process is incompatible), which is simple and easy to realize.

The above display region refers to a region where displaying is implemented, and the frame region is generally a region where a drive trace, a drive circuit such as a GOA (Gate Driver on Array) drive circuit is provided, or an in-screen camera, an earphone, or a loudspeaker, etc., is provided.

The method in which the first controller is bound to the display substrate in the frame region is not specifically limited. Exemplarily, the first controller and the display substrate in the frame region may be directly bound; alternatively, the first controller and the display substrate located in the frame region may be bound through other structures.

It should be noted that the transparent antenna in the display region is a highly transparent grid linear structure, and the transparent antenna in the frame region is not limited. Exemplarily, it may be a grid linear structure or a solid structure.

The embodiments of the present application further provide a method for driving the above electronic device.

The driving method includes:

S01: controlling, by a first controller, the display substrate to display; and S02: controlling, by a second controller, the transparent antenna to radiate.

In the method for driving the electronic device provided in the embodiments of the present application, the first controller and the second controller may control operations of the display substrate and the transparent antenna, respectively, so that an RF chip and a connection board of the antenna may be used separately without being integrated with the display chip (the process is not compatible), which is simple and easy to realize.

The description provided herein describes many concrete details. However, it may be understood that the embodiments of the present application may be implemented without those concrete details. In some of the embodiments, well-known processes, structures and techniques are not described in detail, so as not to affect the understanding of the description.

Finally, it should be noted that the above embodiments are merely intended to explain the technical solutions of the present application, and not to limit them. Although the present application is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present application.

The invention claimed is:

1. A method for fabricating a transparent antenna, comprising:

providing a first substrate;

forming a defining layer on the first substrate;

processing the defining layer to have a first groove, wherein an opening width in a first direction of the first groove at a first distance between the first groove and the first substrate along a direction perpendicular to the first substrate is less than an opening width in the first direction of the first groove at a second distance between the first groove and the first substrate, the first distance is greater than the second distance, and the first direction is parallel to the first substrate; and forming an electrode layer in the first groove of the defining layer, wherein the electrode layer comprises a radiation pattern and a feeder line which comprise a grid linear structure.

2. The method according to claim 1, wherein the forming the defining layer on the first substrate comprises:

forming a dielectric layer on the first substrate;

forming a mask layer on the dielectric layer;

the processing the defining layer to have the first groove comprises:

processing the mask layer to have a second groove; and processing the dielectric layer to have a third groove, wherein an opening width of at least part of the second groove in the first direction is less than an opening width of the third groove in the first direction; and the forming the electrode layer in the first groove of the defining layer comprises:

forming the electrode layer in the second groove of the mask layer and in the third groove of the dielectric layer.

3. The method according to claim 2, wherein after the processing the dielectric layer to have the third groove and before the forming the electrode layer in the second groove of the mask layer and in the third groove of the dielectric layer, the method further comprises:

forming a filling layer at least in the second groove of the mask layer and in the third groove of the dielectric layer, wherein the filling layer has a fourth groove; and the forming the electrode layer at least in the second groove of the mask layer and in the third groove of the dielectric layer comprises:

forming the electrode layer in the fourth groove of the filling layer.

4. The method according to claim 3, wherein the processing the defining layer to have the first groove comprises:

processing the mask layer to have the second groove;

processing the dielectric layer to have the third groove, wherein an opening width of the second groove in the first direction is less than the opening width of the third groove in the first direction; and the forming the filling layer at least in the second groove of the mask layer and in the third groove of the dielectric layer comprises:

forming the filling layer on a surface of the mask layer on a side away from the first substrate, in the second groove of the mask layer and in the third groove of the dielectric layer.

5. The method according to claim 4, wherein a material of the dielectric layer comprises a flexible material.

6. The method according to claim 5, wherein after the forming the electrode layer in the fourth groove of the filling layer, the method further comprises:

removing the first substrate.

7. The method according to claim 4, wherein a material of the mask layer comprises a non-metallic material.

8. The method according to claim 7, wherein after the forming the mask layer on the dielectric layer and before the processing the dielectric layer to have the third groove, the method further comprises:

forming a first photoresist on the mask layer;

processing the first photoresist, so that the mask layer has the second groove;

processing the dielectric layer, so that the dielectric layer has the third groove; and removing the first photoresist.

9. The method according to claim 4, wherein a material of the mask layer comprises a metal material.

10. The method according to claim 9, wherein after the forming the mask layer on the dielectric layer and before the processing the dielectric layer to have the third groove, the method further comprises:

forming a first photoresist on the mask layer;

processing the first photoresist, so that the mask layer has the second groove;

removing the first photoresist;

forming a second photoresist on the mask layer;

processing the dielectric layer to have the third groove; and removing the second photoresist.

11. The method according to claim 9, wherein after the forming the mask layer on the dielectric layer and before the processing the dielectric layer to have the third groove, the method further comprises:

forming a first photoresist on the mask layer;

processing the first photoresist, so that the mask layer has the second groove;

processing the dielectric layer, so that the dielectric layer has the third groove; and removing the first photoresist.

12. The method according to claim 4, wherein the filling layer comprises a first sub-filling layer, a second sub-filling layer and a third sub-filling layer, the first sub-filling layer is connected to the third sub-filling layer through the second sub-filling layer, the second sub-filling layer is provided close to the first substrate, the first sub-filling layer and the third sub-filling layer are provided away from the first substrate, the first sub-filling layer and the third sub-filling layer cover the surface of the mask layer, the first sub-filling layer and the third sub-filling layer are symmetrical about a central axis of the second sub-filling layer and have a groove, and the central axis is perpendicular to the first substrate; and an opening width of the groove between the first sub-filling layer and the third sub-filling layer in the first direction is less than the opening width of the second groove of the mask layer in the first direction.

13. The method according to claim 12, wherein the first sub-filling layer comprises a first filling portion and a second filling portion, the third sub-filling layer comprises a third filling portion and a fourth filling portion, the first filling portion is connected to the second sub-filling layer through the second filling portion, the third filling portion is connected to the second sub-filling layer through the fourth filling portion, the first filling portion and the third filling portion are symmetrical about the center axis of the second sub-filling layer and have a groove, and the second filling portion and the fourth filling portion are symmetrical about the center axis of the second sub-filling layer and have a groove; and an opening width of the groove between the first filling portion and the third filling portion in the first direction is less than an opening width of the groove between the second filling portion and the fourth filling portion in the first direction.

14. The method according to claim 13, wherein a cross-sectional shape of the first filling portion close to the third filling portion along the direction perpendicular to the first substrate comprises an arc; and a cross-sectional shape of the groove between the second filling portion and the fourth filling portion along the direction perpendicular to the first substrate comprises an inverted trapezoid.

15. The method according to claim 13, wherein after the forming the filling layer on the surface of the mask layer on the side away from the first substrate, in the second groove of the mask layer and in the third groove of the dielectric layer, and before the forming the electrode layer in the fourth groove of the filling layer, the method further comprises:

forming a leveling layer at least in the fourth groove of the filling layer;

processing the leveling layer to at least partially fill the groove between the second filling portion and the fourth filling portion; and the forming the electrode layer in the fourth groove of the filling layer comprises:

forming the electrode layer at least in the groove between the first filling portion and the third filling portion.

16. The method according to claim 15, wherein the forming the leveling layer at least in the fourth groove of the filling layer comprises:

forming the leveling layer on the surface of the filling layer on the side away from the first substrate and in the fourth groove of the filling layer;

the processing the leveling layer to at least partially fill the groove between the second filling portion and the fourth filling portion comprises:

processing the leveling layer to be located between the first filling portion and the first substrate, and between the third filling portion and the first substrate, and have a fifth groove; and the forming the electrode layer at least in the groove between the first filling portion and the third filling portion comprises:

forming the electrode layer in the groove between the first filling portion and the third filling portion and in the fifth groove.

17. The method according to claim 15, wherein the forming the leveling layer at least in the fourth groove of the filling layer comprises:

forming the leveling layer on the side of the filling layer away from the first substrate, and in the fourth groove of the filling layer;

the processing the leveling layer to at least partially fill the groove between the second filling portion and the fourth filling portion comprises:

processing the leveling layer to fully fill the groove between the second filling portion and the fourth filling portion; and the forming the electrode layer at least in the groove between the first filling portion and the third filling portion comprises:

forming the electrode layer in the groove between the first filling portion and the third filling portion.

18. A transparent antenna fabricated by the method according to claim 1, comprising:

a first substrate;

a defining layer provided on the first substrate, wherein the defining layer has a first groove, an opening width in a first direction of the first groove at a first distance between the first groove and the first substrate along a direction perpendicular to the first substrate is less than an opening width in the first direction of the first groove at a second distance between the first groove and the first substrate, the first distance is greater than the second distance, and the first direction is parallel to the first substrate; and an electrode layer provided in the first groove of the defining layer, wherein the electrode layer comprises a radiation pattern and a feeder line which comprise a grid linear structure.

19. An electronic device, comprising the transparent antenna according to claim 18.

20. A method for driving the electronic device according to claim 19, comprising:

controlling, by the first controller, the display substrate to display; and controlling, by the second controller, the transparent antenna to radiate.

* * * * *